US010868476B2

(12) United States Patent
Yu et al.

(10) Patent No.: US 10,868,476 B2
(45) Date of Patent: Dec. 15, 2020

(54) POWER CONVERTING APPARATUS, AND PHOTOVOLTAIC MODULE INCLUDING THE SAME

(71) Applicant: LG Electronics Inc., Seoul (KR)

(72) Inventors: Sunho Yu, Seoul (KR); Kanghwi Kim, Seoul (KR); Daihyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 16/422,531

(22) Filed: May 24, 2019

(65) Prior Publication Data
US 2019/0363645 A1 Nov. 28, 2019

(30) Foreign Application Priority Data

May 24, 2018 (KR) .................. 10-2018-0058685

(51) Int. Cl.
*H02M 7/5387* (2007.01)
*H02M 3/335* (2006.01)
*H02M 1/42* (2007.01)
*H02J 3/38* (2006.01)
*H02M 1/00* (2006.01)

(52) U.S. Cl.
CPC .......... *H02M 7/5387* (2013.01); *H02J 3/385* (2013.01); *H02M 1/4208* (2013.01); *H02M 3/33584* (2013.01); *H02M 3/33592* (2013.01); *H02M 2001/0009* (2013.01)

(58) Field of Classification Search
CPC .................................................. H02M 7/5387
See application file for complete search history.

(56) References Cited

U.S. PATENT DOCUMENTS

| 7,463,500 B2* | 12/2008 | West | H02J 3/381 363/132 |
|---|---|---|---|
| 10,361,641 B2* | 7/2019 | Lee | H02M 7/5387 |
| 10,715,054 B2* | 7/2020 | Lee | H02S 40/34 |
| 2013/0322126 A1 | 12/2013 | Pan et al. | |

FOREIGN PATENT DOCUMENTS

| CN | 102403922 | 4/2012 |
|---|---|---|
| JP | H09131075 | 5/1997 |
| JP | 2009077512 | 4/2009 |
| KR | 1020110136167 | 12/2011 |

* cited by examiner

Primary Examiner — Hai L Nguyen
(74) Attorney, Agent, or Firm — Fish & Richardson P.C.

(57) ABSTRACT

Disclosed are a power converting apparatus and a photovoltaic module including the same. The photovoltaic module includes: a converter configured to convert a level of DC power; an inverter configured to convert a half sine wave voltage from the converter into an AC voltage; and a controller configured to control the converter and the inverter based on an output current and an output voltage of the inverter, wherein a plurality of switching elements in the inverter is respectively turned on once in each cycle, and wherein the controller is configured to, based on a difference between a grid voltage and an output current of the inverter, control a bidirectional current to flow to the converter. Accordingly, the power converting apparatus including the unfolding inverter is able to control a power factor.

24 Claims, 17 Drawing Sheets

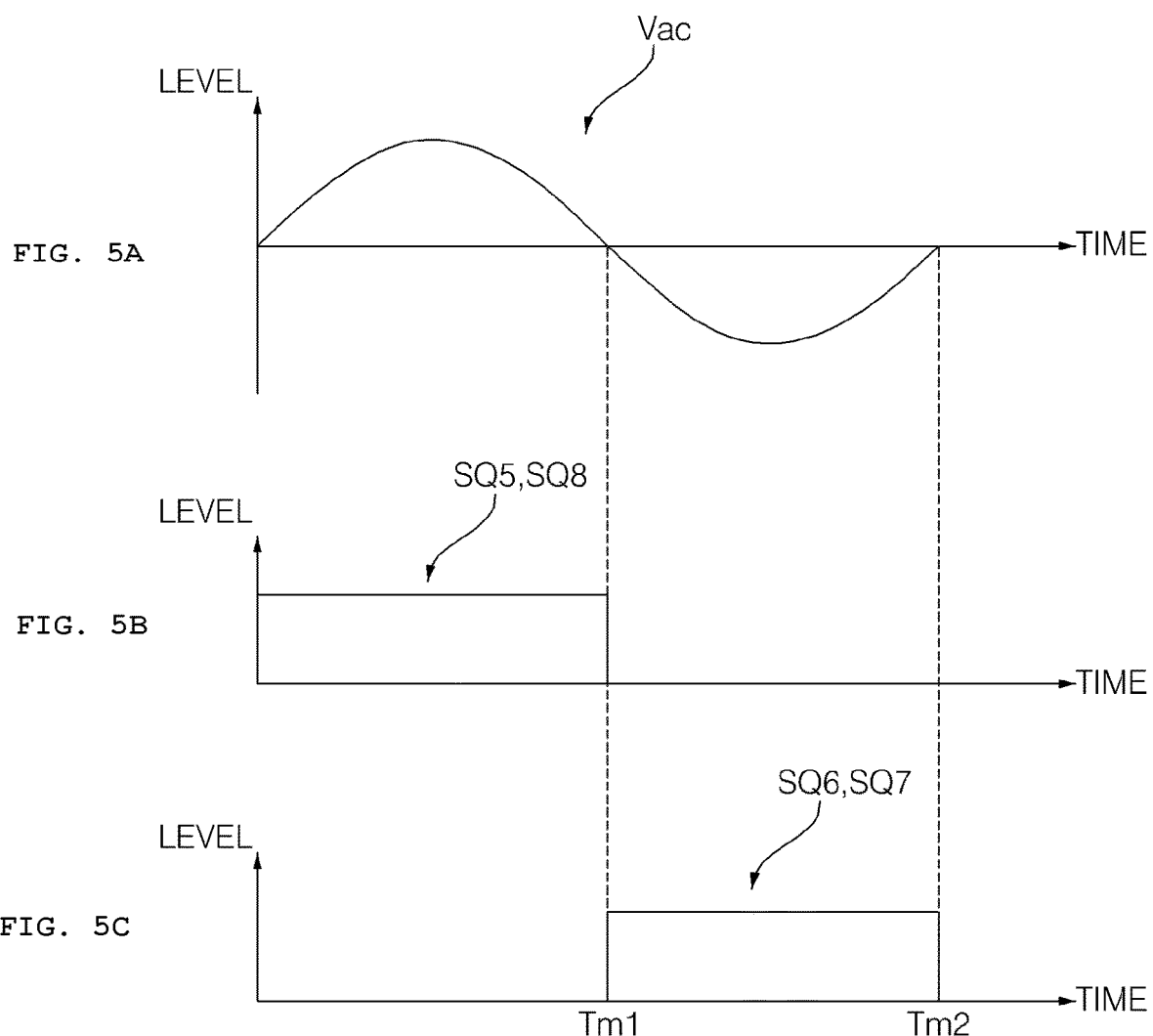

POWER CONVERTING APPARATUS, AND PHOTOVOLTAIC MODULE INCLUDING THE SAME

CROSS-REFERENCE TO RELATED APPLICATION

This application claims the priority benefit of Korean Patent Application No. 10-2018-0058685, filed on May 24, 2018, the disclosure of which is incorporated herein by reference.

BACKGROUND OF THE INVENTION

1. Field of the Invention

The present invention relates to a power converting apparatus and a photovoltaic module including the same, and more particularly to a power converting apparatus including an unfolding inverter and capable of controlling a power factor, and a photovoltaic module including the power converting apparatus.

2. Description of the Related Art

A power converting apparatus is adapted to a photovoltaic module or the like, which produces reusable energy, to provide alternating power (AC) or the like.

In particular, a transformer, a leakage inductor, and the like are used in a converter of the power converting apparatus in order to convert direct power (DC) power produced by a photovoltaic module or the like.

Meanwhile, in the case where an inverter provided in the power converting apparatus is an unfolding inverter, control is performed only at a zero-crossing point, and thus, if a grid voltage is unstable, it is sometimes not allowed to control AC power output from the power converting apparatus.

That is, the power converting apparatus including the unfolding inverter has a limitation in controlling reactive power.

SUMMARY OF THE INVENTION

An object of the present invention is to provide a power converting apparatus including an unfolding inverter and capable of controlling a power factor, and a photovoltaic module including the power converting apparatus.

Another object of the present invention is to provide a power converting apparatus capable of outputting AC power stably in connection with a grid, and a photovoltaic module including the power converting apparatus.

A power converting apparatus and a photovoltaic module including the same according to an embodiment of the present invention to achieve the above objects include: a converter configured to convert a level of input DC power; an inverter configured to convert a half sine wave voltage from the converter into an AC voltage; an output current detector configured to detect an output current of the inverter; an output voltage detector configured to detect an output voltage of the inverter; and a controller configured to control the converter and the inverter based on the output current and the output voltage, wherein a plurality of switching elements in the inverter is respectively turned on once in each cycle, and wherein the controller is configured to, based on a difference between a grid voltage and the output current of the inverter, control a bidirectional current to flow to the converter.

The controller may be configured to: control a current to flow from the inverter to the converter in a first period in which the current is output from the converter; and control a current to flow from the converter to the inverter in a second period subsequent to the first period.

The controller may be configured to: control to store energy in a capacitor unit in a first period in which a current is output from the converter; and output the energy from the capacitor in a second period subsequent to the first period.

The controller may be configured to increase an amount of negative polarity currents to be output from the converter as a phase difference between the grid voltage and the output current of the inverter increases.

The controller may be configured to increase a level of a current to flow from the inverter to the converter as a phase difference between the grid voltage and the output current of the inverter increases.

The controller may be configured to, when the output current of the inverter is lagging the grid voltage, output a negative polarity in a first period in which a current is output from the converter and to output a positive polarity current in a second period subsequent to the first period.

The controller may be configured to, when an output current of the inverter is leading the grid voltage, output a positive polarity current in a first period in which a current is output from the converter and to output a negative polarity current in a second period subsequent to the first period.

The controller may be configured to, when a phase of a current output from the inverter and a phase of the grid voltage coincide with each other, output only a positive polarity current, not a negative polarity current, from the converter.

The controller may be configured to: control a primary side voltage of the transformer to be greater than a secondary side voltage of the transformer in a partial section of a control cycle in a first period in which a current is output from the converter; and control the primary side voltage of the transformer to be greater than the secondary side voltage of the transformer in a partial section of a control cycle in a second period of the current output from the converter.

The controller may be configured to: control a primary side voltage of the transformer to be greater than a secondary side voltage of the transformer in a partial section of a control cycle after a first reference point in time in the first period; and control the primary side voltage of the transformer to be greater than the secondary side voltage of the transformer in a partial section before the first reference point in time in a second period in which a current is output from the converter.

A power converting apparatus and a photovoltaic module including the same according to another embodiment of the present invention to achieve the above objects includes: a bidirectional converter configured to convert DC power input from a DC source into a half sine wave voltage; an unfolding inverter configured to allow a half sine wave voltage to pass therethrough by a plurality of switching elements during one half cycle of a grid voltage, and to reverse the half sine wave voltage during the other half cycle so that the half sine wave voltage is converted into AC power; and a power factor correction unit configured to control a power factor by controlling a phase of the grid voltage and a phase of the AC power output from the unfolding inverter.

In a section in which power output from the bidirectional converter is smaller than 0 or negative in polarity, current correction may be performed to make the half sine wave voltage have an opposite polarity.

The unfolding inverter may include: a first leg including a first switching element and a second switching element connected in series; and a second leg including a third switching element and a fourth switching element connected in series.

The first leg and the second leg in the unfolding inverter may have different switching frequencies.

A current corresponding to the half sine wave voltage may include a negative polarity current only in a section where the current correction is performed, and include a positive polarity current in other sections.

A current from the bidirectional converter may flow to an output terminal in a normal section and flow to an input terminal in a section where current correction is performed.

A power converting apparatus and a photovoltaic module including the same according to yet another embodiment of the present invention to achieve the above object include: a converter configured to convert a level of DC power; an inverter configured to convert a half sine wave voltage from the converter into an AC voltage; an output current detector configured to detect an output current from the inverter; an output voltage detector configured to detect an output voltage from the inverter; and a controller configured to control the converter and the inverter based on the output current and the output voltage, wherein a plurality of switching elements in the inverter is respectively turned on once in each cycle, and wherein the controller is configured to control a bidirectional current to flow to the converter based on a difference between a grid voltage and an output current of the inverter.

A power converting apparatus and a photovoltaic module including the same according to an embodiment of the present invention include: a converter configured to convert a level of input DC power; an inverter configured to convert a half sine wave voltage from the converter into an AC voltage; an output current detector configured to detect an output current of the inverter; an output voltage detector configured to detect an output voltage of the inverter; and a controller configured to control the converter and the inverter based on the output current and the output voltage, wherein a plurality of switching elements in the inverter is respectively turned on once in each cycle, and wherein the controller is configured to, based on a difference between a grid voltage and the output current of the inverter, control a bidirectional current to flow to the converter. Accordingly, the power converting apparatus including an unfolding inverter is enabled to control reactive power and a power factor. Hence, it is possible to output AC power stably in connection with a grid.

In particular, in the case of controlling reactive power, there is an advantageous effect in that an amount of controllable reactive power is not limited.

In addition, a bidirectional current may be controlled by the controller, without an additional circuit, and therefore, a manufacturing cost may be reduced.

The controller may be configured to: control a current to flow from the inverter to the converter in a first period in which the current is output from the converter; and control a current to flow from the converter to the inverter in a second period subsequent to the first period. Accordingly, the converter in the power converting apparatus including the unfolding inverter may operate as a bidirectional converter. Hence, it is possible to control a power factor.

The controller may be configured to: control to store energy in a capacitor unit in a first period in which a current is output from the converter; and output the energy from the capacitor in a second period subsequent to the first period. Accordingly, the converter in the power converting apparatus including the unfolding inverter may operate as a bidirectional converter. Hence, it is possible to control a power factor.

The controller may be configured to increase an amount of negative polarity currents to be output from the converter as a phase difference between the grid voltage and the output current of the inverter increases. Accordingly, it is possible to control a power factor.

The controller may be configured to increase a level of a current to flow from the inverter to the converter as a phase difference between the grid voltage and the output current of the inverter increases. Accordingly, it is possible to control a power factor.

The controller may be configured to, when the output current of the inverter is lagging the grid voltage, output a negative polarity current in a first period in which a current is output from the converter and to output a positive polarity current in a second period subsequent to the first period. Accordingly, the converter in the power converting apparatus including the unfolding inverter may operate as a bidirectional converter. Hence, it is possible to control a power factor.

The controller may be configured to, when an output current of the inverter is leading the grid voltage, output a positive polarity current in a first period in which a current is output from the converter and to output a negative polarity current in a second period subsequent to the first period. Accordingly, the converter in the power converting apparatus including the unfolding inverter may operate as a bidirectional converter. Hence, it is possible to control a power factor. The controller may be configured to: control a primary side voltage of the transformer to be greater than a secondary side voltage of the transformer in a partial section of a control cycle in a first period in which a current is output from the converter; and control the primary side voltage of the transformer to be greater than the secondary side voltage of the transformer in a partial section of a control cycle in a second period of the current output from the converter. Accordingly, the converter in the power converting apparatus including the unfolding inverter may operate as a bidirectional converter. Hence, it is possible to control a power factor.

The controller may be configured to: control a primary side voltage of the transformer to be greater than a secondary side voltage of the transformer in a partial section of a control cycle after a first reference point in time in the first period; and control the primary side voltage of the transformer to be greater than the secondary side voltage of the transformer in a partial section before the first reference point in time in a second period in which a current is output from the converter. Accordingly, the converter in the power converting apparatus including the unfolding inverter may operate as a bidirectional converter. Hence, it is possible to control a power factor.

A power converting apparatus and a photovoltaic module including the same according to another embodiment of the present invention include: a bidirectional converter configured to convert DC power input from a DC source into a half sine wave voltage; an unfolding inverter configured to allow a half sine wave voltage to pass therethrough by a plurality of switching elements during one half cycle of a grid voltage, and to reverse the half sine wave voltage during the other half cycle so that the half sine wave voltage is converted into AC power; and a power factor correction unit configured to control a power factor by controlling a phase of the grid voltage and a phase of the AC power output from the unfolding inverter. Accordingly, it is possible to control a power factor simply.

In a section in which power output from the bidirectional converter is smaller than 0 or negative in polarity, current correction may be performed to make the half sine wave voltage have an opposite polarity. Accordingly, it is possible to control a power factor.

A current corresponding to the half sine wave voltage may include a negative polarity current only in a section where current correction is performed, and include a positive polarity current in other sections. Accordingly, it is possible to control a power factor.

A current from the bidirectional converter may flow to an output terminal in a normal section and flow to an input terminal in a section where current correction is performed. Accordingly, it is possible to control a power factor.

A power converting apparatus and a photovoltaic module including the same according to another embodiment of the present invention to achieve the above objects include: a converter configured to convert a level of DC power; an inverter configured to convert a half sine wave voltage from the converter into an AC voltage; an output current detector configured to detect an output current from the inverter; an output voltage detector configured to detect an output voltage from the inverter; and a controller configured to control the converter and the inverter based on the output current and the output voltage, wherein a plurality of switching elements in the inverter is respectively turned on once in each cycle, and wherein the controller is configured to perform control such that a bidirectional current flows in the converter based on a difference between a grid voltage and an output current of the inverter. Accordingly, the converter in the power converting apparatus including the unfolding inverter may operate as a bidirectional converter. Hence, it is possible to control a power factor.

BRIEF DESCRIPTION OF THE DRAWINGS

The embodiments will be described in detail with reference to the following drawings in which like reference numerals refer to like elements wherein:

FIGS. 5A-5C and 6A-6D are diagrams referred to in the description of operation of the inverter shown in FIG. 4;

DETAILED DESCRIPTION OF THE PREFERRED EMBODIMENTS

Hereinafter, the present invention will be described in detail with reference to the accompanying drawings.

In the following description, the suffixes "module" and "unit" of elements herein are used for convenience of description and need not have any distinguishable meanings or functions. Accordingly, the suffixes "module" and "unit" can be used interchangeably.

Figure 1A:
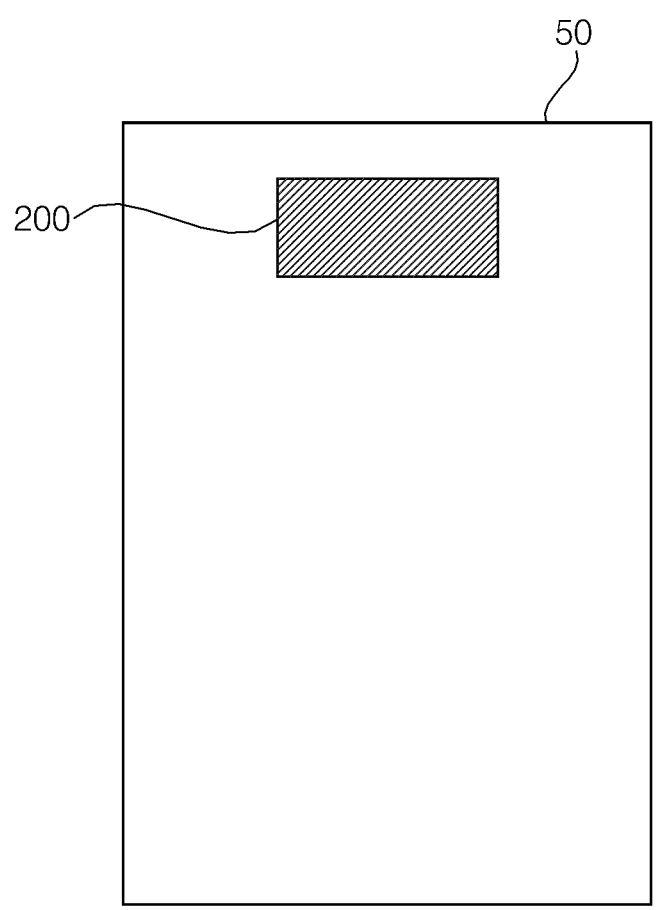
FIG. 1A is a diagram showing a photovoltaic module according to an embodiment of the present invention.

FIG. 1A is a diagram showing a photovoltaic module according to an embodiment of the present invention.

Referring to FIG. 1, a photovoltaic module 50 according to an embodiment of the present invention may include a solar cell module 100, and a junction box 200 including a power converting apparatus 500 (see FIG. 12) for converting DC power from the solar cell module and outputting converted power.

FIG. 1 shows the case where the junction box 200 is attached to a rear surface of the solar cell module 100, but aspects of the present invention are not limited thereto. The junction box 200 may be spaced apart from and provided separately from the solar cell module 100.

Meanwhile, the power converting apparatus 500 (see FIG. 12) in the photovoltaic module 50 may convert DC power output from the solar cell module 100 into AC power, and output the AC power.

To this end, a converter 530 (see FIG. 12) and an inverter 540 (see FIG. 12) may be provided in the power converting apparatus 500 (see FIG. 12) of the photovoltaic module 50.

The present invention describes a power converting apparatus that converts a level of DC power from the solar cell module 100 through the converter 530 and then converts AC power through the inverter 540.

Meanwhile, the present invention proposes a method in which a power converting apparatus including an unfolding inverter controls a power factor.

To this end, the power converting apparatus 500 and the photovoltaic module 50 including the same according to an embodiment of the present invention include: a converter 530 for converting a level of input DC power; an inverter 540 for converting a half sine wave voltage from the converter 530 into an AC voltage; and a controller 550 for controlling the converter 530 and the inverter 540 based on an output current and an output voltage of the inverter 540, wherein a plurality of switching elements in the inverter 540 is respectively turned on once in each cycle, and wherein the controller 550 controls, based on a difference between a grid voltage Vacr and an output current of the inverter 540, a bidirectional current to flow to the converter 530. Accordingly, the power converting apparatus 500 including the unfolding inverter is capable of controlling a power factor. As a result, it is possible to output AC power stably in connection with the grid.

Meanwhile, a power converting apparatus 500 and a photovoltaic module 50 including the same according to another embodiment of the present invention include an unfolding inverter 540, and a controller 550 controls a power factor based on a difference between a grid voltage Vacr and an output current of the inverter 540. Accordingly, in the power converting apparatus 500 including the unfolding inverter 540, the converter 530 may operate as a bidirectional converter 530. As a result, it is possible to control a power factor simply.

Figure 1B:
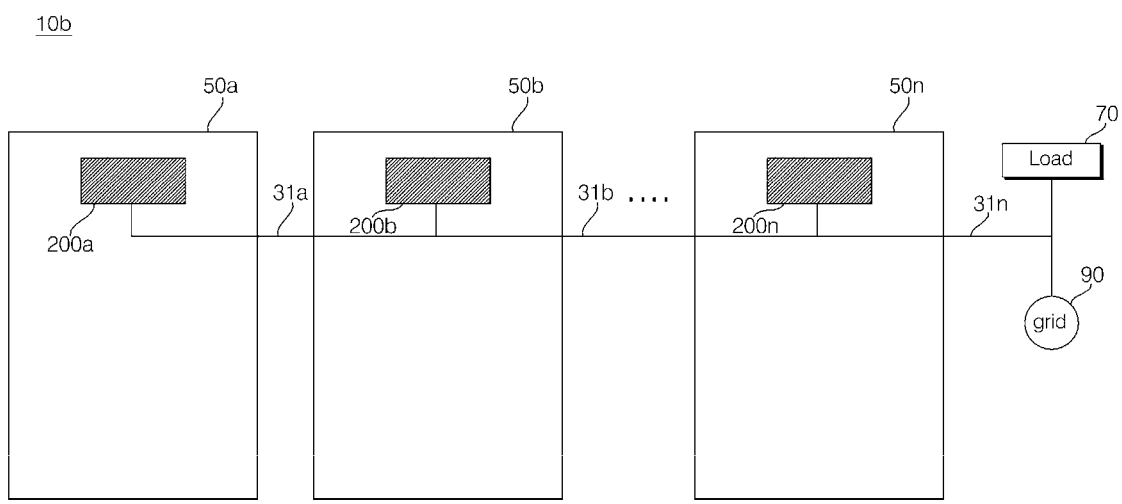
FIG. 1B is a diagram showing an example of a photovoltaic system including a photovoltaic module according to an embodiment of the present invention.

FIG. 1B is a diagram showing an example of a photovoltaic system including a photovoltaic module according to an embodiment of the present invention.

Referring to FIG. 1B, a photovoltaic system 10*b* according to an embodiment of the present invention may include a plurality of photovoltaic modules 50*a*, 50*b*, . . . , 50*n*.

Meanwhile, the photovoltaic system 10*b* according to an embodiment of the present invention may further include a grid 90 or a load 70.

According to the photovoltaic system 10*b* shown in FIG. 1B, a plurality of photovoltaic modules 50*a*, 50*b*, . . . , 50*n* connected in parallel to each other.

The plurality of photovoltaic modules 50*a*, 50*b*, . . . , 50*n* my respectively include solar cell modules 100*a*, 100*b*, . . . , 100*n*, and junction boxes 200*a*, 200*b*, . . . , 200*n* for converting DC power from the respective solar cell modules and outputting converted power.

FIG. 1B shows the case where the junction boxes 200*a*, 200*b*, . . . , 200*n* are attached to rear surfaces of the respective solar cell modules 100*a*, 100*b*, . . . , 100*n*, but aspects of the present invention are not limited thereto. The junction boxes 200*a*, 200*b*, . . . , 200*n* may be spaced apart from and provided separately from the respective solar cell modules 100*a*, 100*b*, . . . , 100*n*.

Meanwhile, cables 31*a*, 31*b*, . . . , 31*n* for supplying AC power from the respective junction boxes 200*a*, 200*b*, . . . , 200*n* to the grid 90 or to the load 70 may be electrically connected to output terminals of the respective junction boxes 200*a*, 200*b*, . . . , 200*n*.

Meanwhile, each power converting apparatus 500 in a plurality of photovoltaic modules 50*a*, 50*b*, . . . , 50*n* includes an unfolding inverter 540, as described above with reference to FIG. 1A, and, based on a difference between a grid voltage Vacr and an output current of the inverter 540, the controller 550 controls a bidirectional current to flow to the converter 530. Accordingly, the power converting apparatus 500 including the unfolding inverter 540 may be capable of controlling a power factor. As a result, it is possible to output AC power stably in connection with the grid.

Figure 2:
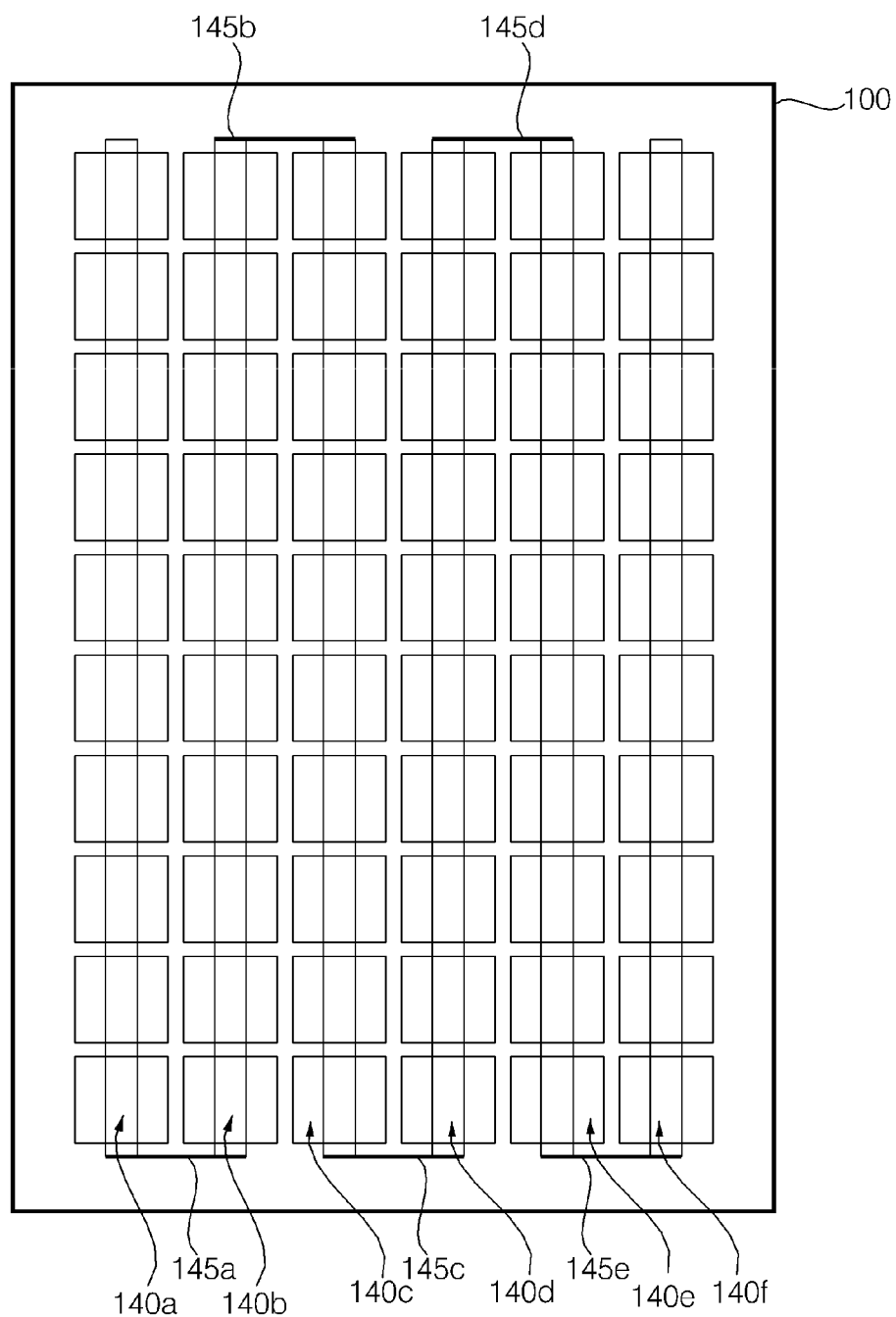
FIG. 2 is a front view of the photovoltaic module according to an embodiment of the present invention.
Figure 3:
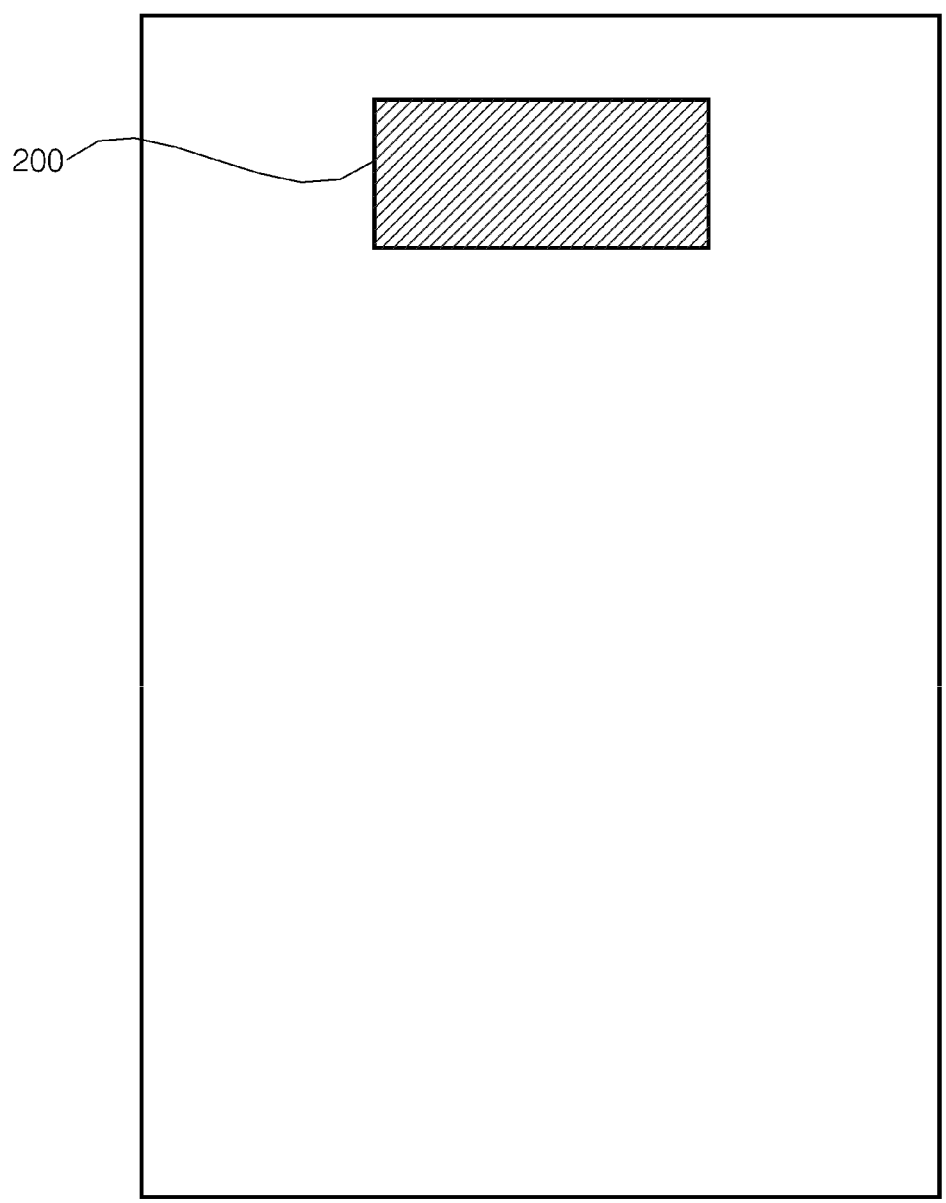
FIG. 3 is a rear view of the photovoltaic module of FIG. 2.

FIG. 2 is a front view of the photovoltaic module according to an embodiment of the present invention and FIG. 3 is a rear view of the photovoltaic module of FIG. 2.

Referring to the figures, the photovoltaic module 50 according to an embodiment of the present invention can include the solar cell module 100 and the junction box 200 provided on the rear side of the solar cell module 100.

The junction box 200 can include at least one bypass diode for preventing a hot spot in the case of occurrence of a shading.

Figure 4:
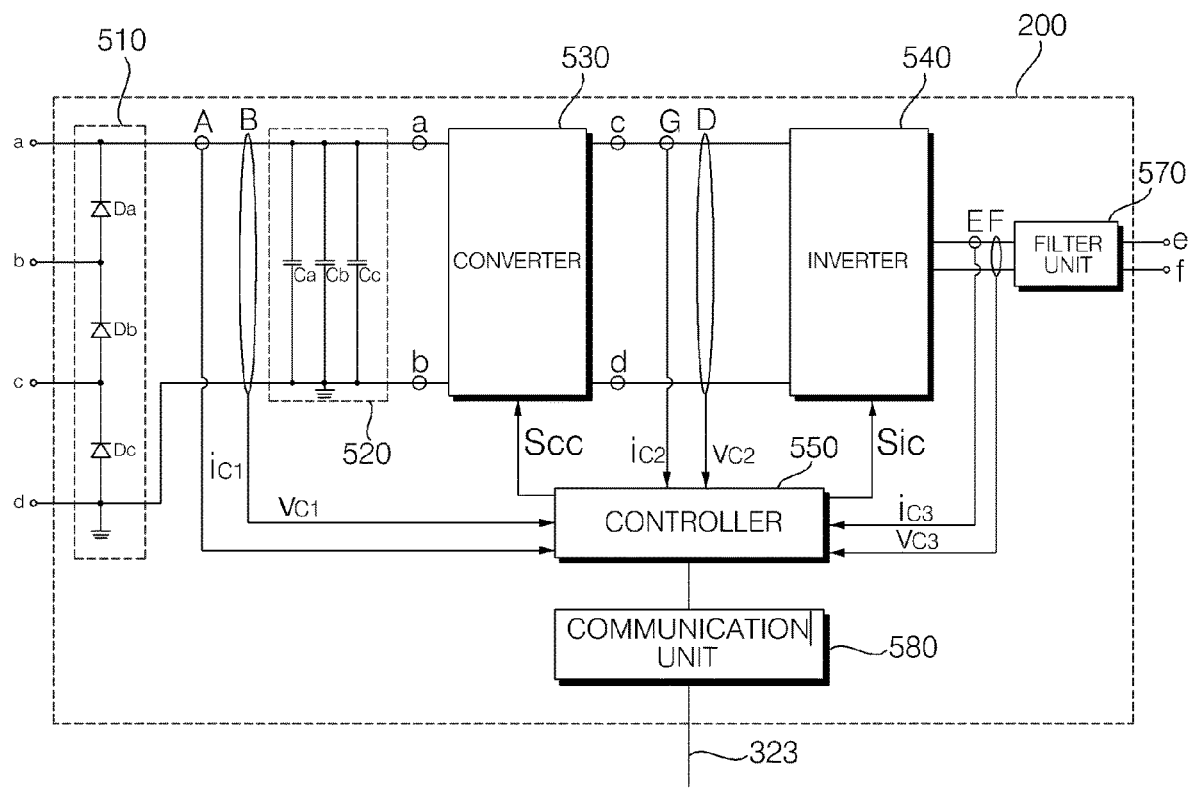
FIG. 4 is a diagram showing an internal circuit of the junction box in the photovoltaic module of FIG. 2.

FIG. 4 shows that a junction box includes three bypass diodes Da, Db and Dc corresponding to four solar cell strings of FIG. 2.

Meanwhile, the junction box 200 can convert DC power supplied from the solar cell module 100. This will be described with reference to FIG. 4 and the following figures.

The solar cell module 100 can include a plurality of solar cells.

The solar cells are connected in a line by means of a ribbon (133 in FIG. 12) to form solar cell strings 140. In this manner, six strings 140*a*, 140*b*, 140*c*, 140*d*, 140*e* and 140*f* are formed and each string includes ten solar cells, for example. Arrangement of solar cells can be modified in various manners from that shown in the figure.

The solar cell strings can be electrically connected through bus ribbons. FIG. 2 shows that the first solar cell string 140*a* is electrically connected to the second solar cell string 140*b*, the third solar cell string 140*c* is electrically connected to the fourth solar cell string 140*d*, and the fifth solar cell string 140*e* is electrically connected to the sixth solar cell string 140*f* through bus ribbons 145*a*, 145*c* and 145*e* arranged at the lower part of the solar cell module 100, respectively.

In addition, FIG. 2 shows that the second solar cell string 140*b* is electrically connected to the third solar cell string 140*c* and the fourth solar cell string 140*d* is electrically connected to the fifth solar cell string 140*e* through bus ribbons 145*b* and 145*d* arranged at the upper part of the solar cell module 100, respectively.

The ribbon connected to the first solar cell string 140*a*, the bus ribbons 145*b* and 145*d*, and the ribbon connected to the fourth solar cell string 140*d* are respectively electrically connected to first to fourth conductive lines, and the first to fourth conductive lines can be connected to the bypass diodes (Da, Db and Dc in FIG. 4) in the junction box 200 provided on the rear side of the solar cell module 100 through an opening formed in the solar cell module 100.

Here, the opening formed in the solar cell module 100 can be formed to correspond to the region in which the junction box 200 is positioned.

FIG. 4 is a diagram showing an internal circuit of the junction box in the photovoltaic module of FIG. 2.

Referring to FIG. 4 the junction box 200 can convert DC power from the solar cell module 100 and output the converted power.

Particularly, the junction box 200 according to the present invention can include a power converting apparatus 500 for outputting AC power.

To this end, the junction box 200 can include the converter 530, the inverter 540 and the controller 550 for controlling the same.

In addition, the junction box 200 can further include a bypass diode unit 510 for bypass, a capacitor unit 520 for storing DC power, and a filter 570 for filtering output AC power.

Meanwhile, the junction box 200 may further include a communication unit 580 for communication with a grid 90 or a load 70 in the outside or with a different junction box.

Further, the junction box 200 can further include an input current detector A, an input voltage detector B, a converter output current detector C, a converter output voltage detector D, an inverter output current detector E and an inverter output voltage detector F.

The controller 550 can control the converter 530, the inverter 540, and the communication unit 580.

The bypass diode unit 510 can include the bypass diodes Dc, Db and Da arranged between the first to fourth conductive lines of the solar cell module 100. Here, the number of bypass diodes is one or more, for example, less than the number of conductive lines by one.

The bypass diodes Dc, Db and Da receive photovoltaic DC power from the solar cell module 100, particularly, from the first to fourth conductive lines in the solar cell module 100. When a reverse voltage is generated in DC power from at least one of the first to fourth conductive lines, the bypass diodes Dc, Db and Da can bypass the DC power.

DC power which has passed through the bypass diode unit 510 can be input to the capacitor unit 520.

The capacitor unit 520 can store the DC power input through the solar cell module 100 and the bypass diode unit 510.

Although the figure shows that the capacitor unit 520 includes a plurality of capacitors Ca, Cb and Cc connected in parallel, a plurality of capacitors can be connected in series and parallel or connected in series to a ground terminal. Alternatively, the capacitor unit 520 can include only one capacitor.

The converter 530 can convert the level of an input voltage from the solar cell module 100, which has passed through the bypass diode unit 510 and the capacitor unit 520.

Particularly, the converter 530 can perform power conversion using DC power stored in the capacitor unit 520.

The converter 530 according to an embodiment of the present invention will be described in more detail with reference to FIG. 12.

Switching elements in the converter 530 can be turned on/off based on a converter switching control signal from the controller 550. Accordingly, level-converted DC power can be output.

The inverter 540 may include a plurality of switching elements Q5 to Q8, and convert DC power, converted by the converter 530, into AC power.

For example, upper switching elements Q5 and Q7 are respectively connected in series to and paired with lower switching elements Q6 and Q8, and thus, total two pairs of upper and lower switching elements Q5, Q6, Q7, and Q8 are connected in parallel. A diode may be connected in reverse parallel to each of the switching elements Q5 to Q8.

The switching elements Q5 to Q8 in the inverter 540 may be turned on/off based on an inverter switching control signal from the controller 550. Accordingly, AC power having a predetermined frequency may be output. Preferably, the AC power has the same frequency (approximately 60 Hz or 50 Hz) as that of an AC frequency of the grid.

Meanwhile, a distance between the converter 530 and the inverter 540 may be referred to as a dc terminal.

The input current detector A can detect input current ic1 supplied from the solar cell module 100 to the capacitor unit 520.

The input voltage detector B can detect an input voltage Vc1 supplied from the solar cell module 100 to the capacitor unit 520. Here, the input voltage Vc1 can be the same as the voltage stored in the capacitor unit 520.

The detected input current ic1 and input voltage vc1 can be input to the controller 550.

The converter output current detector C detects output current ic2 from the converter 530, that is, DC-terminal current, and the converter output voltage detector D detects an output voltage vc2 from the converter 530, that is, a DC-terminal voltage. The detected output current ic2 and output voltage vc2 can be input to the controller 550.

The inverter output current detector E detects current ic3 output from the inverter 540 and the inverter output voltage detector F detects a voltage vc3 output from the inverter 540. The detected current ic3 and voltage vc3 are input to the controller 550.

The controller 550 can output control signals for controlling the switching elements of the converter 530. Particularly, the controller 550 can output a turn-on timing signal of the switching elements included in the converter 530 based on at least one of the detected input current ic1, input voltage vc1, output current ic2, output voltage vc2, output current ic3 and output voltage vc3.

Further, the controller 550 can output inverter control signals for controlling the switching elements Q5 to Q8 of the inverter 540. Particularly, the controller 550 can output a turn-on timing signal of the switching elements Q5 to Q8 of the inverter 540 based on at least one of the detected input current ic1, input voltage vc1, output current ic2, output voltage vc2, output current ic3 or output voltage vc3.

Further, the controller 550 can calculate a maximum power point with respect to the solar cell module 100 and control the converter 530 to output DC power corresponding to maximum power according thereto.

Meanwhile, the communication unit 580 may perform communication with the grid 90 or the load 70 in the outside or with a different junction box.

For example, through power line communication, the communication unit 580 may exchange data with the communication unit 580 to communicate with the grid 90 or the load 70 in the outside or with a different junction box.

Meanwhile, the communication unit 580 may receive phase information, voltage information, current information, frequency information, etc. regarding the grid from the grid 90 or the load 70 in the outside or from a different junction box.

Meanwhile, the communication unit 580 may transmit phase information, voltage information, current information, frequency information, etc. regarding the photovoltaic module 50 from the grid 90 or the load 70 in the outside or from a different junction box.

Meanwhile, the filter unit 570 may be disposed at an output terminal of the inverter 540.

In addition, the filter unit 570 may include a plurality of passive elements, and control a phase difference between an AC current io and an AC voltage vo, which are output from the inverter 540, based on at least some of the plurality of passive elements.

Meanwhile, the inverter 540 in FIG. 4 is an unfolding inverter. Operation of the unfolding inverter 540 will be described with reference to FIGS. 5A to 6D.

FIGS. 5A to 6D are diagrams referred to in the description of operation of the inverter shown in FIG. 4.

Figure 12:
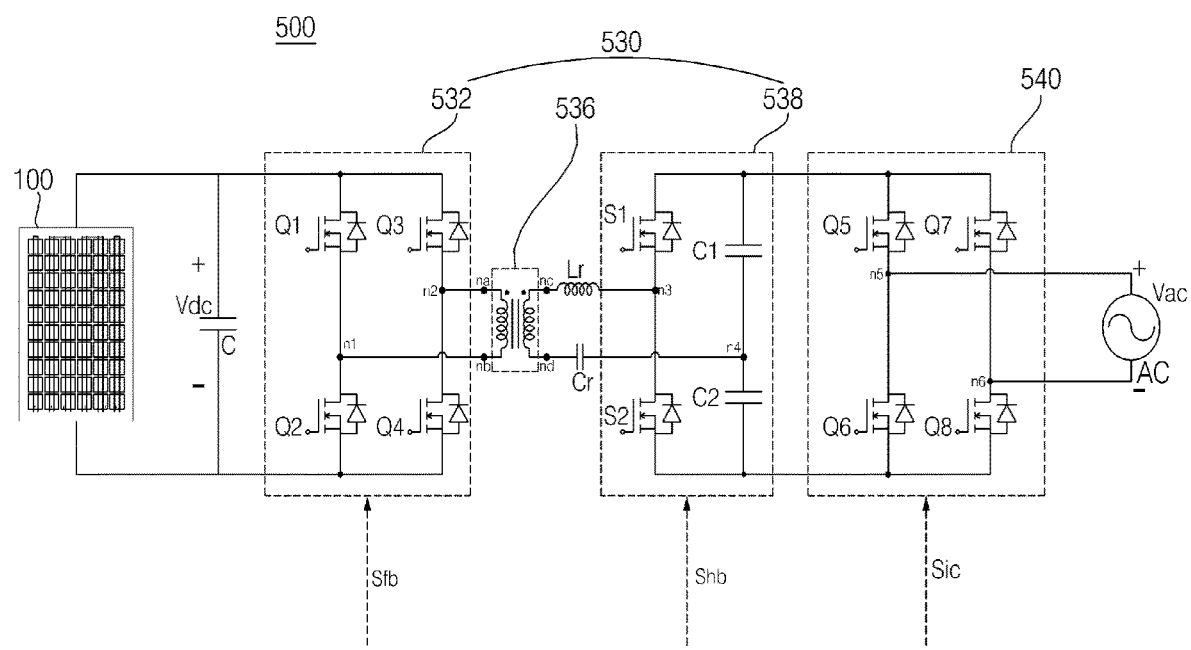
FIG. 12 is a diagram of a circuit of a power converting apparatus in a photovoltaic module according to an embodiment of the present invention.

Referring to FIGS. 5A to 5C, in order to output an AC voltage Vac shown in FIG. 5A, a fifth switching element Q5 and an eighth switching element Q8 among the plurality of switching elements Q5 to Q8 in the inverter 540 shown in FIG. 4 or FIG. 12 are turned on when the AC voltage Vac is positive in polarity, and a sixth switching element Q6 and a seventh switching element Q7 among the plurality of switching elements Q5 to Q8 are turned on when the Ac voltage Vac is negative in polarity.

That is, the plurality of switching elements Q5 to Q8 in the inverter 540 is respectively turned on once in each cycle.

To this end, when the AC voltage Vac is positive in polarity, the controller 550 may output control signals SQ5 and SQ8 for turning on the fifth switching element Q5 and the eighth switching element Q8 in the inverter 540 to the fifth switching element Q5 and the eighth switching element Q8.

Meanwhile, when the AC voltage is negative in polarity, the controller 550 may output control signals SQ6 and SQ7 for turning on the sixth switching element Q6 and the seventh switching element Q7 in the inverter 540 to the sixth switching element Q6 and the seventh switching element Q7.

FIGS. 6A to 6D are diagrams showing a relationship among a grid voltage, an input current input to an unfolding inverter, and an output current output from the unfolding inverter.

Figure 6A:
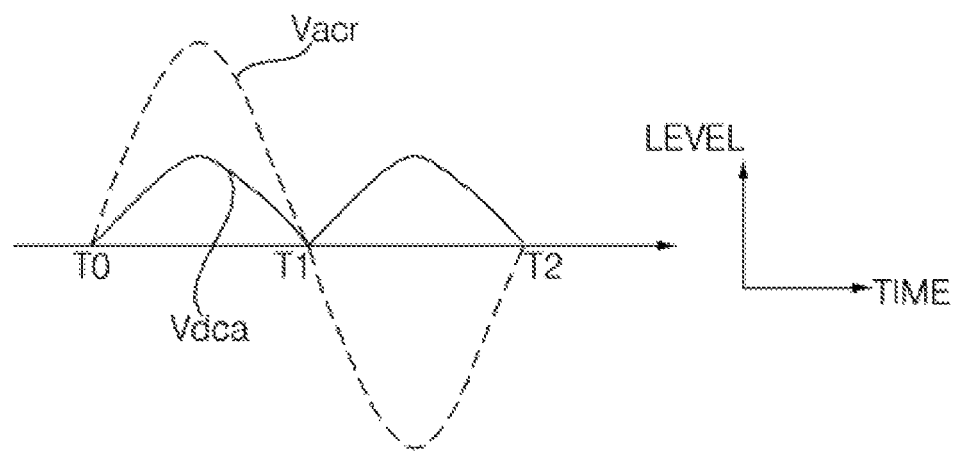

FIG. 6A shows an example in which a grid voltage Vacr and an input current Vdca input to the unfolding inverter 540 are synchronized.

Figure 6B:
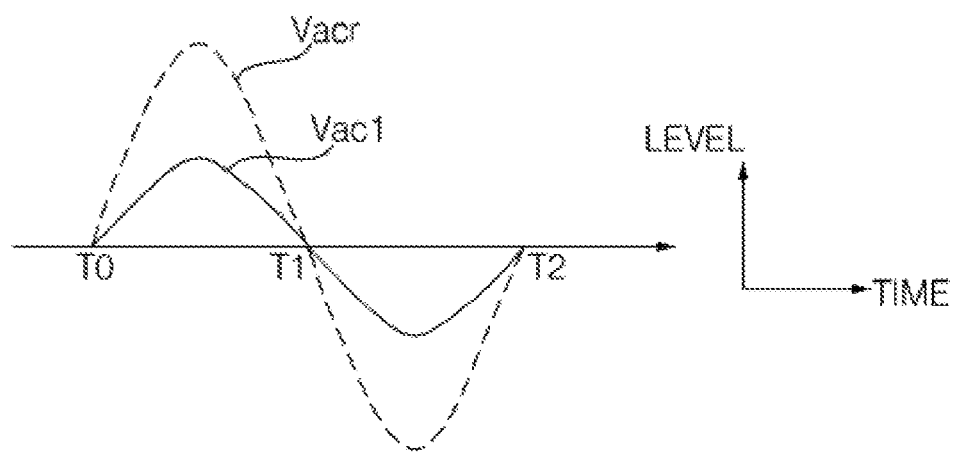

Next, FIG. 6B shows an example in which a grid voltage Vacr and an output current Vac1 output from the unfolding inverter 540 are synchronized.

In the example of FIGS. 6A and 6B, as the grid voltage Vacr and the output current Vac1 output from the unfolding inverter 540 are synchronized, or in other words as there is no phase difference therebetween, it is not necessary to control reactive power.

Figure 6C:
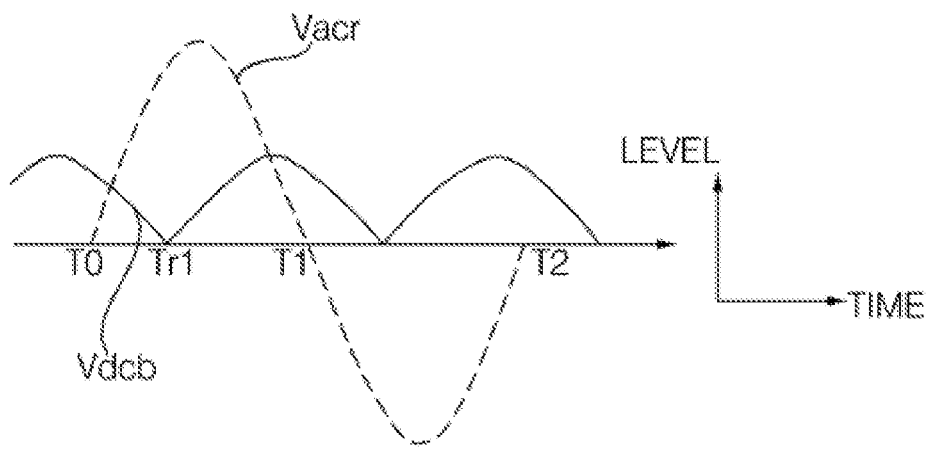

Next, FIG. 6C shows an example in which the grid voltage Vacr and the input current Vdcb input to the unfolding inverter 540 are asynchronized.

Figure 6D:
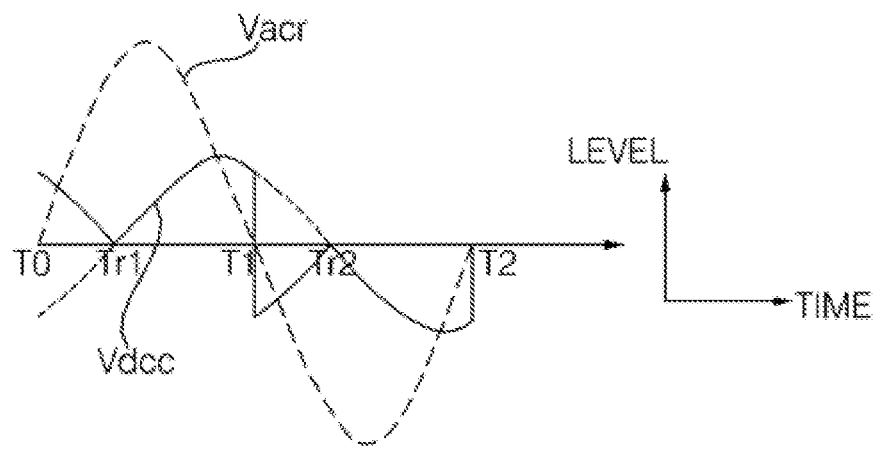

FIG. 6D shows an example in which the grid voltage Vacr crosses zero at T0, T1, and T2, and the input current Vdcb input to the unfolding inverter 540 crosses zero at Tr1.

Next, FIG. 6D shows an example in which the grid voltage Vacr and the output current Vdcc output from the unfolding inverter 540 are asynchronized.

Since the unfolding inverter 540 is able to perform control only at a zero crossing point, the output current Vdcc output from the unfolding inverter 540 crosses zero at T0, T1, and T2 in addition to Tr1.

Accordingly, as shown in FIG. 6D, the output current Vdcc output from the unfolding inverter 540 is not in the form of a sine wave voltage. Therefore, in a power converting apparatus including the unfolding inverter 540, it is difficult to control reactive power, especially a power factor.

The present invention proposes a method in which a power converting apparatus including the unfolding inverter 540 is allowed to control reactive power and control a power factor in order to stabilize the grid. A detailed description thereof will be provided with reference to FIG. 7 and other drawings.

Figure 7:
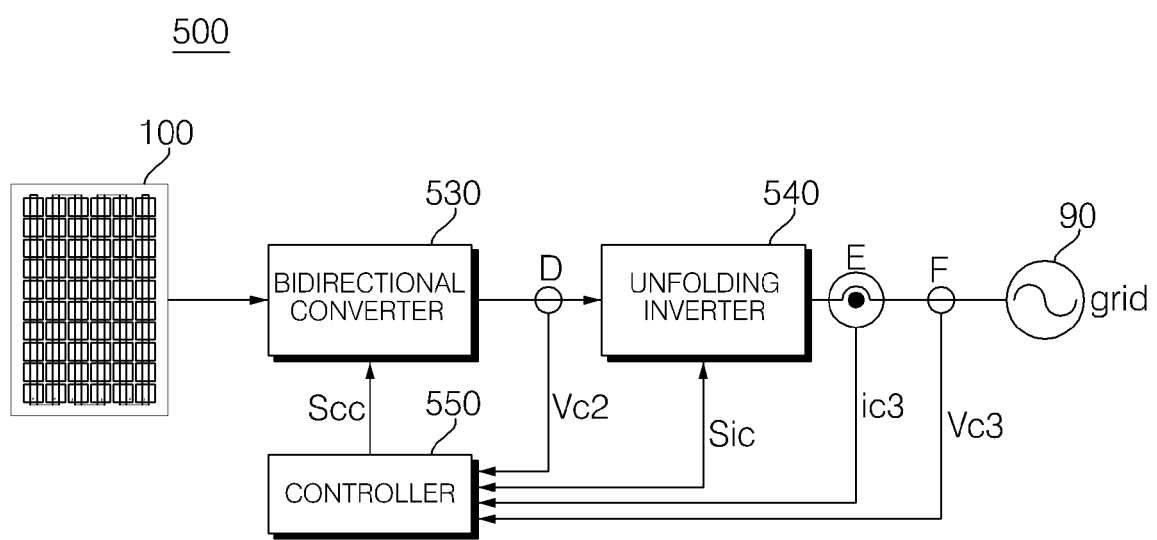
FIG. 7 is a simple example of a circuit of a power converting apparatus according to an embodiment of the present invention.

FIG. 7 is an exemplary diagram of a circuit of a power converting apparatus according to an embodiment of the present invention, and FIGS. 8A to 11B are diagrams referred to in the description of operation of the power converting apparatus of FIG. 7.

Referring to FIG. 7, a power converting apparatus 500 according to an embodiment of the present invention may include: a converter 530 for converting a level of input DC power; an inverter 540 for converting a half sine wave voltage from the converter 530 into an AC voltage; an output current detector E for detecting an output current ic3 of the inverter 540; an output voltage detector F for detecting an output voltage Vc3 of the inverter 540; and a controller 550 for controlling the converter 530 and the inverter 540 based on the output current ic3 and the output voltage Vc3.

Meanwhile, the converter 530 may a bidirectional converter that converts DC power, input from a DC source, into a half sine wave voltage.

Meanwhile, the inverter 540 may be an unfolding inverter that allows a half sine wave voltage to pass therethrough by a plurality of switching elements during one half cycle of a grid voltage while reversing the half sine wave voltage during the other half cycle of the grid voltage so that the half sine wave voltage is converted into AC power.

For the purposes of reactive power control and power factor control, the converter 550 controls the converter 530 rather than the unfolding inverter 540.

Accordingly, the controller 550 may include a power factor correction unit that controls a power factor by controlling a grid power and phase of output AC power of the unfolding inverter 540. Alternatively, the controller 550 may be referred to as a power factor correction unit.

In particular, the controller 550 may perform current correction so as to enable the converter 530 to operate as a bidirectional converter to control reactive power and a power factor.

Specifically, the controller 550 or the power factor correction unit may perform current correction so as to make a half sine wave voltage have the opposite polarity in a period in which output power of the bidirectional converter 530 is smaller than 0 or negative in polarity.

The controller 550 or the power factor correction unit may control a half sine wave voltage to have a negative polarity current only in a section where current correction is performed, and to have a positive polarity current in other sections.

Figure 8A:
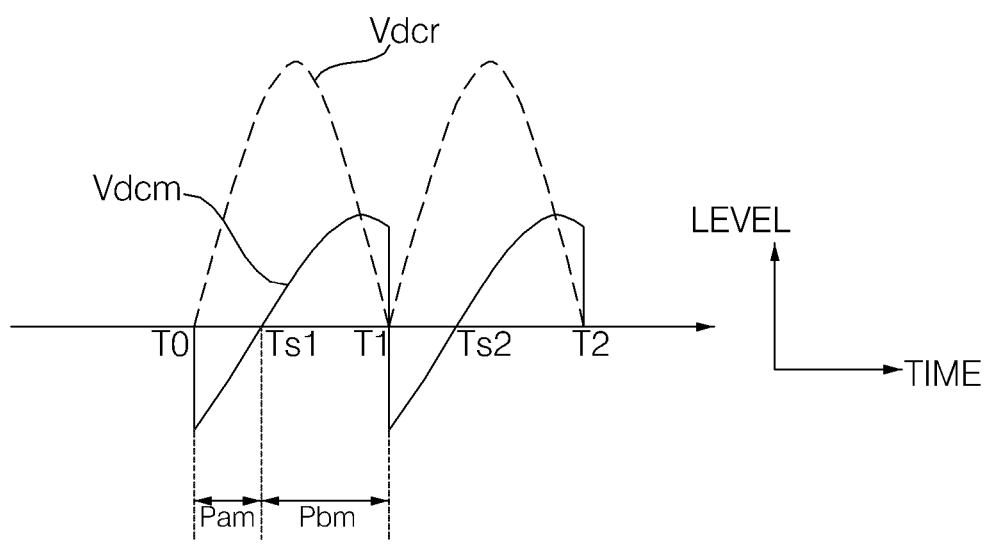
FIGS. 8A-8D, 9A-9B, 10A-10B and 11A-11B are diagrams referred to in the description of operation of the power converting apparatus of FIG. 7.

For example, as shown in FIG. 6C, in the case where an input current Vdcb input to the unfolding inverter 540 crosses zero at Tr1 rather than T0, T1, and T2 at which a grid voltage Vacr crosses zero, the controller 550 or the power factor correction unit may control a current Vdcm to flow from the inverter 540 to the converter 530 in a first period Pam between T0 and Tr1, and control the current Vdcm to flow from the converter 530 to the inverter 540 in a second period Pbm subsequent to the first period Pam, as shown in FIG. 8A.

That is, as shown in FIG. 8A, the controller 550 or the power factor correction unit may control the current Vdcm, which is input to the inverter 540, to be negative in polarity in the first period Pam between T0 and Tr1, and may control the current Vdcm to maintain positive in polarity in the second period Pbm subsequent to the first period Pma.

Specifically, in a normal section such as the second period Pbm, a current flows to an output terminal of the bidirectional converter 530, and therefore, the current Vdcm flows from the converter 530 to the inverter 540. In a section such as the first period Pam where current correction is performed, a current flows from the inverter 540 to the converter 530, and therefore, the current flows to the input terminal of the bidirectional converter 530.

Figure 8B:
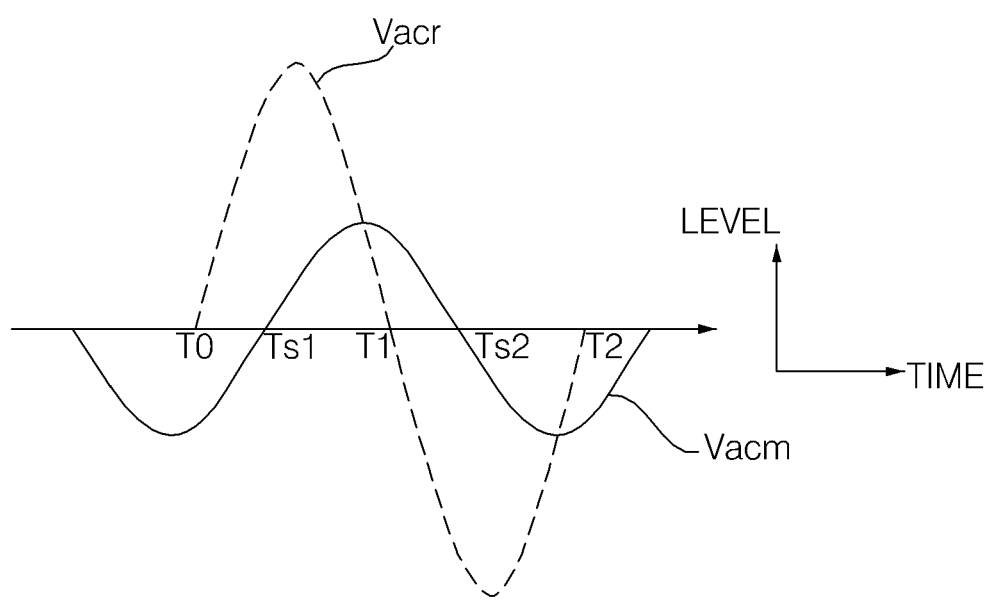

Accordingly, it is possible to control reactive power a power factor, and therefore, the current Vacm output from the inverter 540, which is a sine wave voltage current, may cross zero at Ts1 and Ts2, not at T0, T1, and T2 at which the grid voltage Vacr crosses zero, as shown in FIG. 8B.

Therefore, it is possible to output DC power stably in connection with the grid.

Meanwhile, as shown in FIG. 8A, the controller 550 may control to store energy in the capacitor unit 520 in the first period Pam between T0 and Tr1, and may output energy from the capacitor 520 in the second period Pbm subsequent to the first period Pam. Accordingly, the converter 530 in the power converting apparatus 500 including the unfolding inverter 540 may operate as a bidirectional converter 530. Therefore, it is possible to control a power factor.

Meanwhile, the controller 550 may control to increase an amount of negative polarity currents to be output from the converter 530 as a phase difference between the grid voltage Vacr and an output current of the inverter 540 increases. Accordingly, it is possible to control a power factor.

For example, the controller 550 may control to increase the first period Pam as a phase difference between the grid voltage Vacr and the output current of the inverter 540 increases.

Meanwhile, the controller 550 may increase a level of a current to flow from the inverter 540 to the converter 530 as a phase difference between the grid voltage Vacr and the output current of the inverter 540 increases.

Figure 8C:
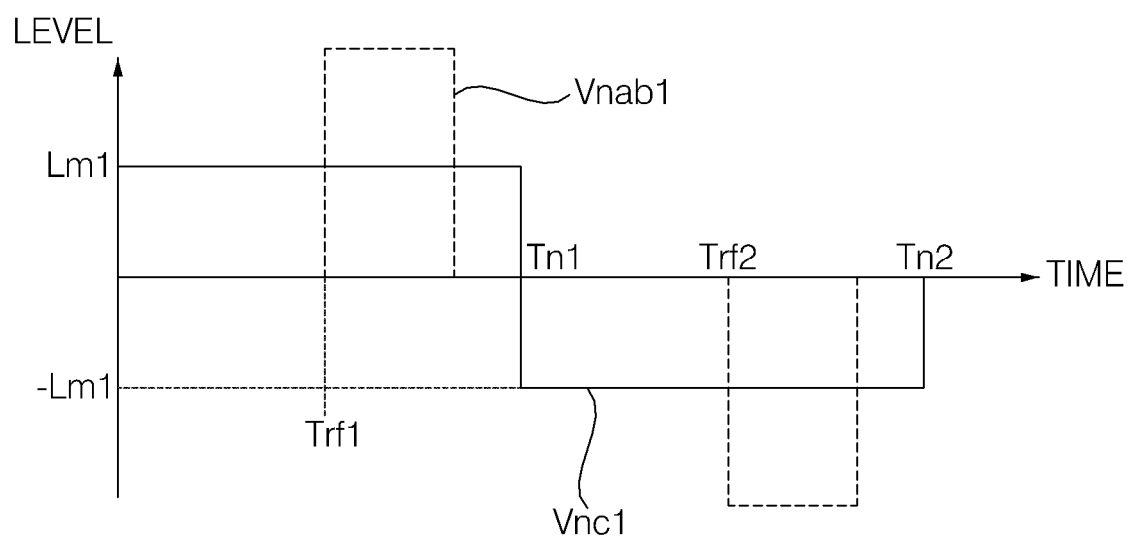
Figure 8D:
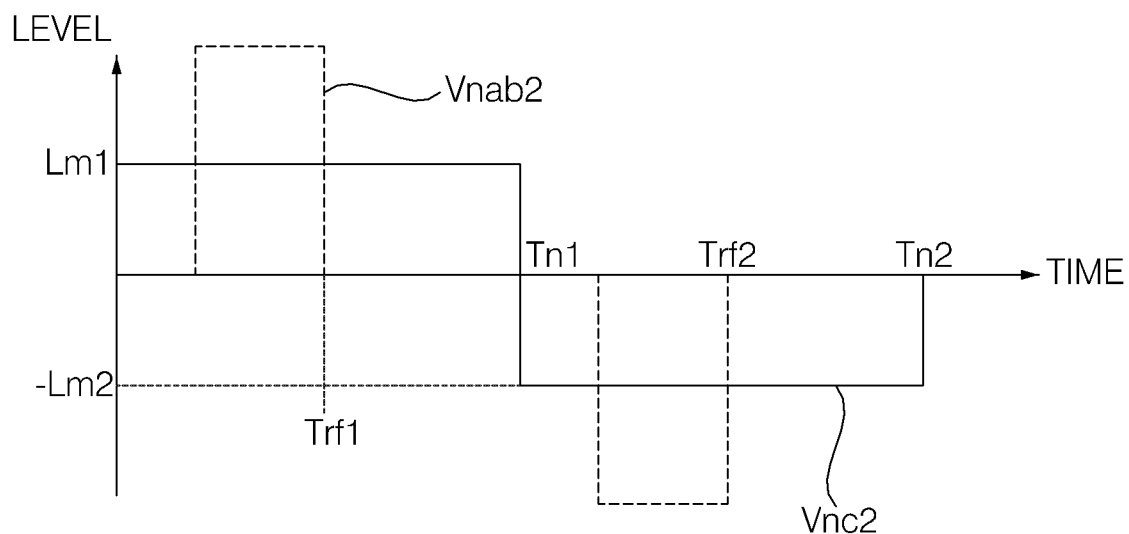

FIGS. 8C and 8D are diagrams showing examples of a primary voltage waveform and a secondary side voltage waveform of a transformer 536 (see FIG. 12) during a first period Pam and a second period Pbm.

FIG. 8C is a diagram showing a primary side voltage waveform Vnab1 and a secondary side voltage waveform Vnc1 during a control cycle in the first period Pam.

The controller 550 may control a primary side voltage of the transformer 536 to be greater than a secondary side voltage of the transformer 536 in a partial section of the control cycle after a first reference point in time Trf1 in the first period Pam. Accordingly, the converter 530 in the power converting apparatus 500 including the unfolding inverter 540 may operate as a bidirectional converter. Therefore, it is possible to control a power factor.

Here, the first reference point in time Tfr1 may be a point in time corresponding to one quarter of the control cycle.

Meanwhile, a width of the section where the primary side voltage of the transformer 536 is greater than the secondary side voltage of the transformer 536 may increase as the first period Pam increases.

FIG. 8D is a diagram showing a primary side voltage waveform Vnab2 and a secondary side voltage waveform Vnc2 during a control cycle in the second period Pbm.

The controller 550 may control a primary side voltage of the transformer 536 to be greater than a secondary side voltage of the transformer in a partial section before a first reference point in time Trf1 in the second period Pbm. Accordingly, the converter 530 in the power converting apparatus 500 including the unfolding inverter 540 may operate as a bidirectional converter 530. Therefore, it is possible to control a power factor.

Here, the first reference point in time Trf1 may be a point in time corresponding to one quarter of the control cycle.

Meanwhile, a width of the section where a primary side voltage of the transformer 536 is greater than a secondary side voltage of the transformer 536 may increase as the second period Pbm increases.

Figure 9A:
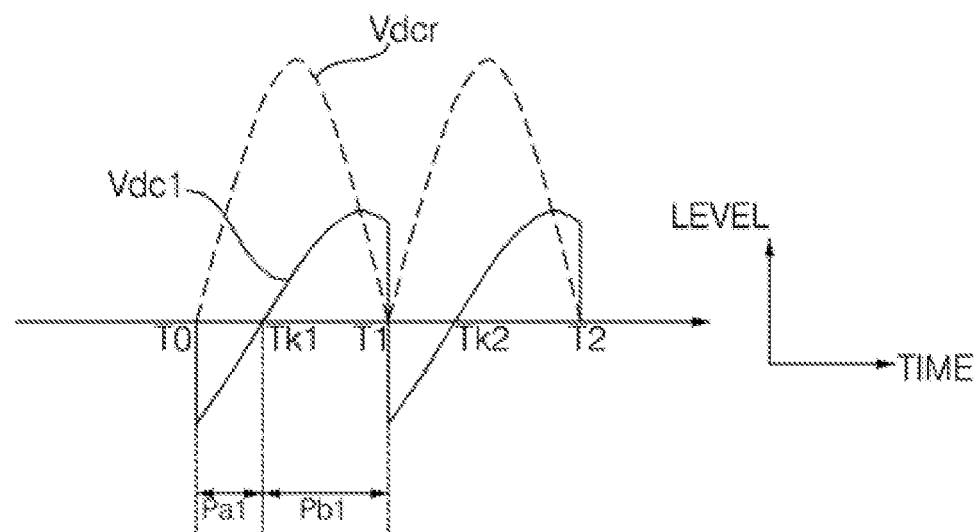
Figure 9B:
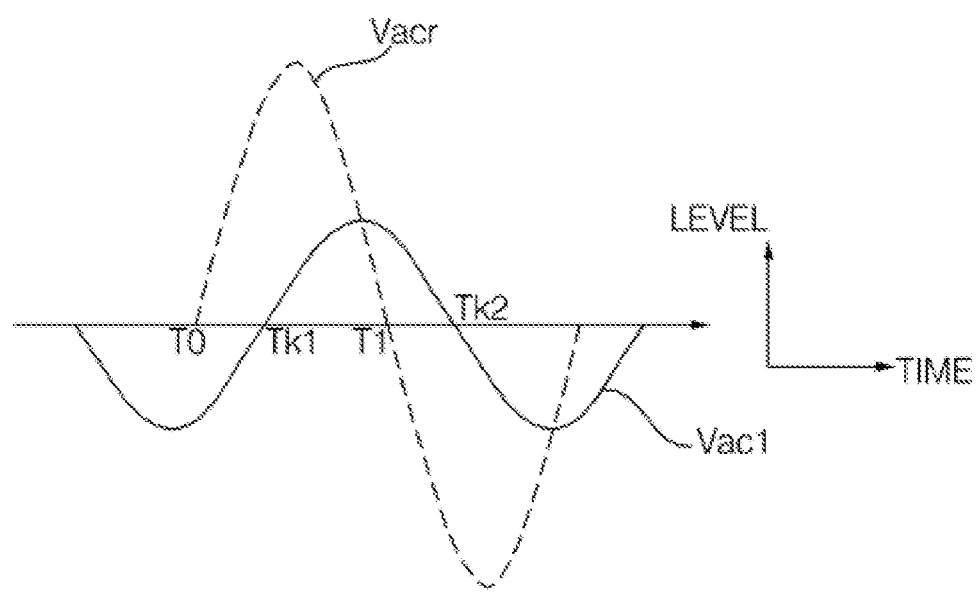

FIGS. 9A and 9B are diagrams showing an example of an output current waveform of an inverter in accordance with operation of the controller 550 when a grid voltage leads in phase.

For example, as shown in FIG. 9B, in the case where the grid voltage Vacr crosses zero at T0, T1, and T2 and a current Vac1 output from the unfolding inverter 540 crosses zero at Tk1 and Tk2, the phase of the grid voltage is faster and thus the grid voltage may be regarded as leading in phase.

As such, in the case where an output current of the inverter 540 is lagging a grid voltage Vacr, the controller 550 may output a negative polarity current in a first period Pa1 in which a current is output from the converter 530, and to output a positive polarity current in a second period Pb1 subsequent to the first period Pa1, as shown in FIG. 9A. Accordingly, the converter 530 in the power converting apparatus 500 including the unfolding inverter 540 may operate as a bidirectional converter 530. Therefore, it is possible to control a power factor.

That is, as shown in FIG. 9A, the controller 550 may control a current Vdc1, which is input to the inverter 540, to be negative in polarity in a first period Pa1 between T0 and Tk1, and control the current Vdc1 to maintain positive in polarity in a second period Pb1 subsequent to the first period Pa1.

Accordingly, it is possible to control reactive power and a power factor, and the current Vac1 output from the inverter 540 is a sine wave voltage current and it may reach zero crossing at Tk1 and Tk2, not at T0, T1, and T2 at which the grid voltage Vacr crosses zero. As a result, it is possible to output AC power stably in connection with the grid.

Figure 10A:
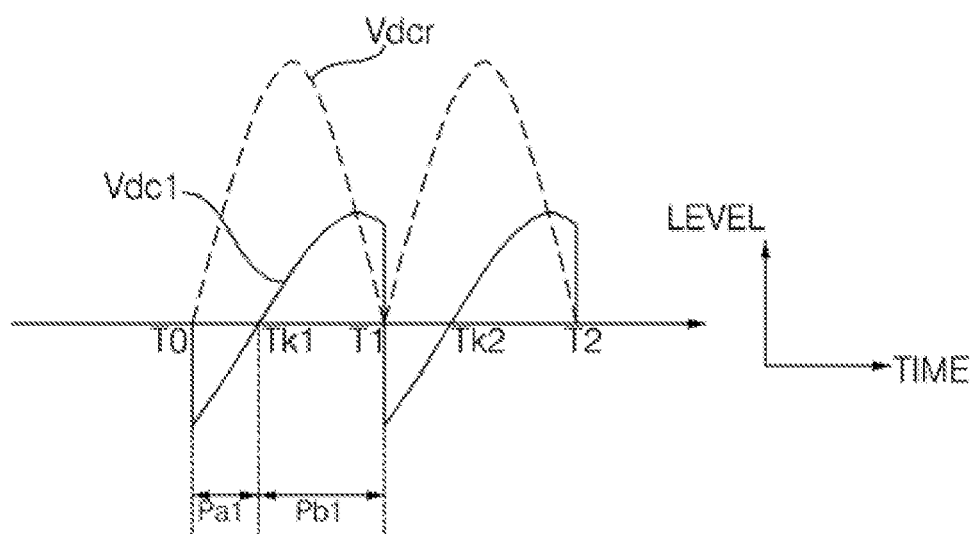
Figure 10B:
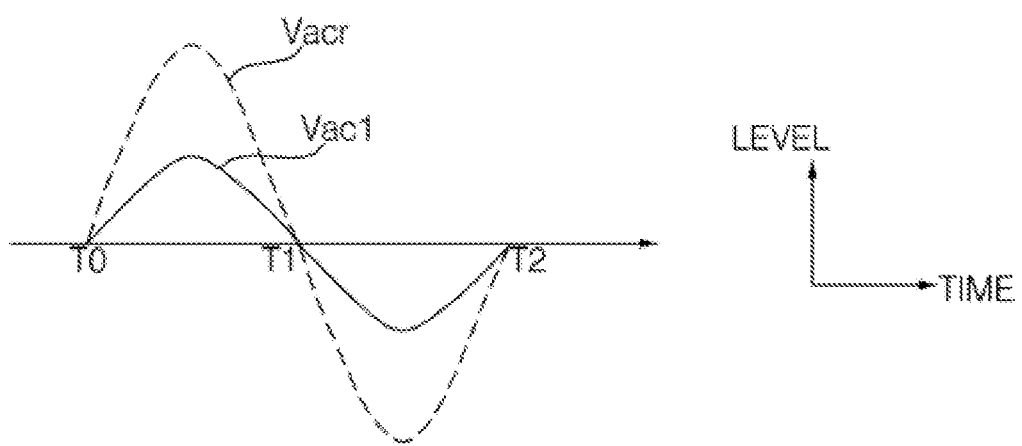

FIGS. 10A and 10B are diagrams showing an example of an output current waveform of an inverter in accordance with operation of the controller 550 when an output current of a grid and an output current of the inverter are synchronized.

For example, as shown in FIG. 10B, in the case where the grid voltage Vacr crosses zero at T0, T1, and T2 and a current Vac2 output from the unfolding inverter 540 crosses zero at T0, T1, and T2, a phase of the grid and a phase of the current output from the unfolding inverter 540 becomes identical.

As such, in the case where the current output from the inverter 540 is synchronized with the grid voltage Vacr, the controller 550 may control the current output from the converter 530 to keep having a value of positive polarity, as shown in FIG. 10A.

That is, as shown in FIG. 10A, the controller 550 may control a current Vdc2, which is input to the inverter 540, to maintain positive in polarity in a period between T0 and T1.

Specifically, in the case where a phase of a current output from the inverter 540 coincides with phase of the grid voltage Vacr, the controller 550 may output only a positive polarity current, not a negative polarity current, from the converter 530.

Accordingly, the current Vac2 output from the inverter 540, which is a sine wave voltage current, may cross zero at points as the same as T0, T1, and T2 at which the grid voltage Vacr crosses zero, as shown in FIG. 10B. As a result, it is possible to output AC power stably in connection with the grid.

Figure 11A:
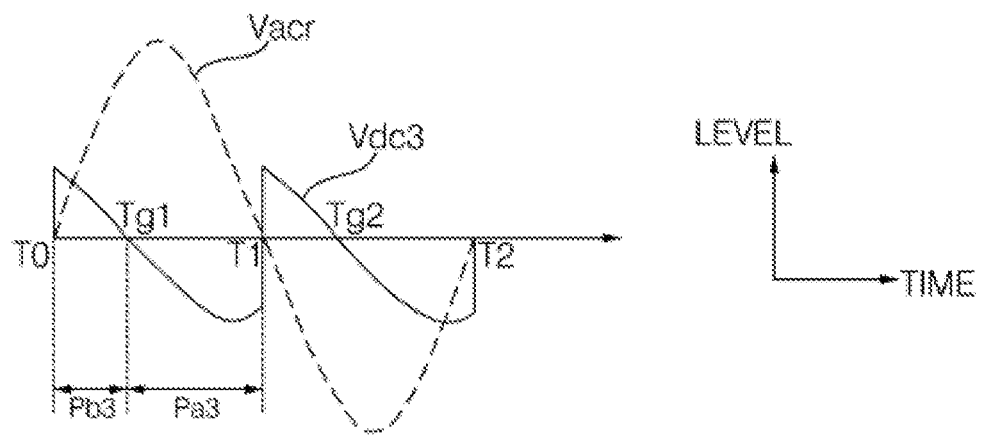
Figure 11B:
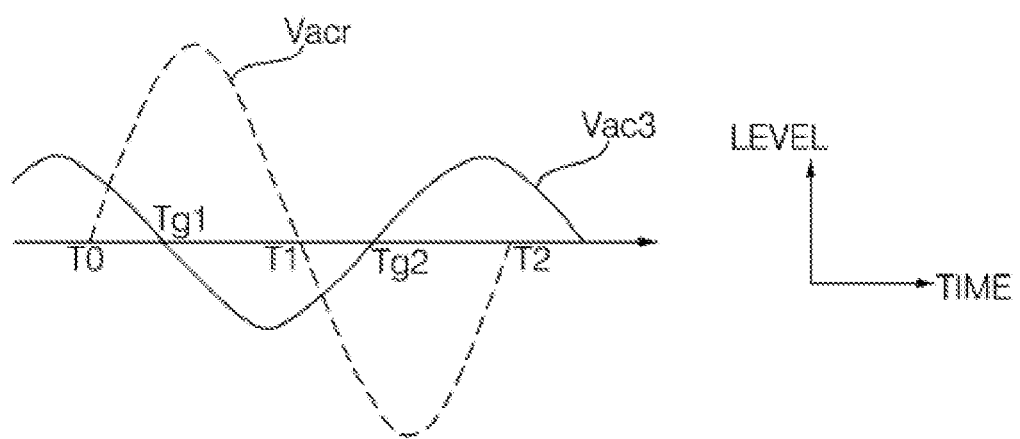

FIGS. 11A and 11B are diagrams showing an example of an output current waveform of an inverter in accordance with operation of the controller 550 when a grid voltage lags in phase.

For example, as shown in FIG. 11B, in the case where a grid voltage Vacr crosses zero T0, T1, and T2 and a current Vac3 output from the unfolding inverter 540 crosses zero at Tg1 and Tg2, a phase of the grid is slower and thus the grid voltage may be regarded as lagging in phase.

As such, in the case where the current output from the inverter 540 is leading the grid voltage Vacr, the controller 550 may output a positive polarity current in a first period Pb3 in which a current is output from the converter 530, and to output a negative polarity current in a second period Pa3 subsequent to the first period Pb3, as shown in FIG. 11A. Accordingly, the converter 530 in the power converting apparatus 500 including the unfolding inverter 540 may operate as a bidirectional converter 530. Therefore, it is possible to control a power factor.

That is, as shown in FIG. 11A, the controller 550 may control a current Vdc3, which is input to the inverter 540, to maintain positive in polarity in a first period Pb3 between T0 and Tg1, and may control the current Vdc3 to be negative in polarity in a second period Pa3 subsequent to the first period Pb3.

Accordingly, it is possible to control reactive power and a power factor. Therefore, the current Vac2 output from the inverter 540, which is a sine wave voltage current, may cross zero at Tg1 and Tg2, not at T0, T1, and T2 at which the grid voltage Vacr crosses zero. As a result, it is possible to output Ac power stably in connection with the grid.

FIG. 12 is a diagram of a circuit of a power converting apparatus in a photovoltaic module according to an embodiment of the present invention.

Referring to FIG. 12, a power converting apparatus 500 in a photovoltaic module 100 according to an embodiment of the present invention may include a converter 530 for converting a level of DC power input from the photovoltaic module 100, and an inverter 570 for converting DC power from a dc terminal into Ac power.

The converter 530 according to an embodiment of the present invention includes: a full bridge switching unit 532 for switching DC power; a transformer 536 having an input side connected to an output terminal of the full bridge switching unit 532; a synchronization rectification unit 538 connected to an output side of the transformer 536; and a resonance capacitor Cr and a resonance inductor Lr, which are connected between the transformer 536 and the synchronization rectification unit 538.

In particular, ripples in an input current may be suppressed by resonance that is caused by the resonance capacitor Cr, the resonance inductor Lr, and the transformer 536.

Meanwhile, switching elements Q1 to Q4 in the full bridge switching unit 532 may perform Zero Voltage Switching (ZVS) and Zero current Switching (ZCS) by the resonance capacitor Cr and the resonance inductor Lr.

As shown in FIG. 12, the full bridge switching unit 532 may include first and second switching elements Q1 and Q2 connected in parallel, and third and fourth switching elements Q3 and Q4 respectively connected in series to the first and second switching elements Q1 and Q2.

In addition, an input side na and nb of the transformer 536 may be connected between a first mode n1, which is between the first switching element Q1 and the second switching element Q2, and a second node n2, which is between the third switching element Q3 and the fourth switching element Q4.

Meanwhile, the inverter 570 may include a first leg including a fifth switching element Q5 and a sixth switching element Q6 connected in series to each other, and a second leg including a seventh switching element Q7 and an eighth switching element Q8 connected in series to each other.

Meanwhile, the first leg and the second leg in the unfolding inverter 540 may have different switching frequencies.

Ac power may be output through the fifth node n5 between the fifth switching element Q5 and the sixth switching element Q6 and the sixth node n6 between the seventh switching node Q7 and the eighth switching element Q8.

Meanwhile, as shown in FIG. 12, the synchronization rectification unit 538 may include ninth and tenth switching elements S1 and S2 connected in series, and first and second capacitor C1 and C2 connected in series.

In this case, the ninth and tenth switching elements S1 and S2 may be connected in parallel to the first and second capacitors C1 and C2.

An output side of the transformer 536 may be connected between a third node n3, which is between the ninth switching element S1 and the tenth switching elements S2, and a fourth node n4, which is between the first capacitor C1 and the second capacitor C2.

Meanwhile, as the synchronization rectification unit 538 is implemented as a half bridge form, the synchronization rectification unit 538 may be referred to as a bridge switching unit.

Meanwhile, as the synchronization rectification unit 538 amplifies an input voltage two times and output the amplified voltage, the synchronization rectification unit 538 may be referred to as a voltage doubler.

Meanwhile, the controller 550 may control the converter 530 and the inverter 570 together.

In particular, the controller 550 may output a control signal Sfb to the full bridge switching unit 532 in the converter 530 in order to perform maximum power point tracking control.

Meanwhile, the controller 550 may output a control signal to the synchronization rectification unit 538 to control the synchronization rectification unit 538.

Meanwhile, the controller 550 may output a control signal Sic to the inverter 540 to control the inverter 540.

Meanwhile, the controller 550 may vary a switching frequency of the full bridge switching unit 532 based on an input voltage of the converter 530 or a voltage of a DC terminal.

Specifically, the controller 550 may control the full bridge switching unit 532 to operate in a buck mode or in a boost mode according to a voltage level of the dc terminal.

Meanwhile, when a voltage of the dc terminal is equal to or higher than a target voltage, the controller 550 may control the full bridge switching unit 532 to operate in the buck mode. When a voltage of the DC terminal is lower than the target voltage, the controller 550 may control the synchronization rectification unit 538, which is a half bridge switching unit, to operate in the boost mode.

Meanwhile, when a voltage of the dc terminal is equal to or higher than a target voltage, the controller 550 may control the full bridge switching unit 532 to operate in the buck mode, and may control the full bridge switching unit 532 to operate at a first switching frequency. When a voltage of the dc terminal is lower than the target voltage, the controller 550 may control the synchronization rectification unit 538, which is a half bridge switching unit, to operate in the boost mode and may control the full bridge switching unit 543 and the synchronization rectification unit 538 to operate at a second switching frequency that is lower than the first switching frequency.

Meanwhile, it is preferable that a switching frequency of the full bridge switching unit 532 is higher than a grid frequency.

For example, the first switching frequency may be 135 kHz and the second switching frequency may be 90 kHz. This enables high-speed switching, and thus a circuit element in the converter 530 may be made compact. In particular, the transformer 536 may be made compact.

Meanwhile, through the buck mode or the boost mode, the controller 550 may control to suppress ripples in a voltage at the dc terminal.

Meanwhile, the switching elements S1 and S2 in the synchronization rectification unit 537 may be switched in sync with the first and second switching elements Q1 and Q2 in the full bridge switching unit 532.

Meanwhile, when a voltage of the dc terminal is equal to or higher than a target voltage, the controller 550 may control a turn-on timing delay to increase as a difference between the voltage at the dc terminal and the target voltage increases.

Meanwhile, in the boost mode, the controller 550 may control to alternately turn on the first and fourth switching elements Q1 and Q4 and the second and third switching element Q2 and Q3 in the full bridge switching unit 532.

Meanwhile, in the boost mode, the controller 550 may operate the full bridge switching unit 532 at a minimum switching frequency and vary a turn-on duty of switching elements in the synchronization rectification unit 538.

For example, while the first and fourth switching elements Q1 and Q4 and the second and third switching elements Q2 and Q3 are alternately turned on, a duty of the ninth and tenth switching elements S1 and S2 in the synchronization rectification unit 538 is varied, turning on the ninth and tenth switching elements S1 and S2.

Meanwhile, while the ninth switching element S1 and the tenth switching element S2 in the synchronization rectification unit 537 are turned on, energy is charged in the resonance inductor Lr. Accordingly, a boost operation is performed.

Meanwhile, when a voltage of the DC terminal is lower than a target voltage, the controller 550 may control to increase a turn-on duty D1b of the second switching element S1 and the tenth switching element S2 in the synchronization rectification unit 538 as a difference between the voltage of the dc terminal and the target voltage increases.

Meanwhile, when a voltage of the DC terminal is lower than a target voltage, the controller 550 may control to increase a turn-on duty of switching elements in the synchronization rectification unit 538 as a difference between the voltage of the dc terminal and the target voltage increases.

Meanwhile, the controller 550 may receive an input voltage Vc1 from the input voltage detector B and a dc terminal voltage Vdc from the dc voltage detector D, and control the full bridge switching unit 532 to operate in the buck mode or the boost mode.

In particular, according to a voltage level at the dc terminal, the controller 550 may control the full bridge switching unit 532 to operate in the buck mode, or may control the synchronization rectification unit 538 to operate in the boost mode.

Specifically, when a voltage of the dc terminal is equal to or higher than a target voltage, the controller 550 may control the full bridge switching unit 532 to operate in the buck mode, and control the full bridge switching unit 532 and the synchronization rectification unit 538 to operate at a first switching frequency. When the voltage of the dc terminal is lower than the target voltage, the controller 550 may control the synchronization rectification unit 538 to operate in the boost mode, and control the full bridge switching unit 532 and the synchronization rectification unit 538 to operate at a second switching frequency that is lower than the first switching frequency.

Figure 13A:
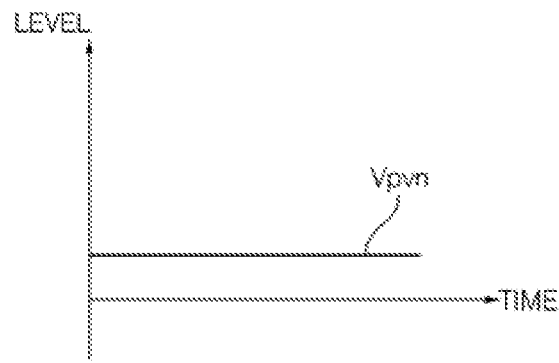
FIGS. 13A to 13C are diagrams referred to in the description of FIG. 12.
Figure 13B:
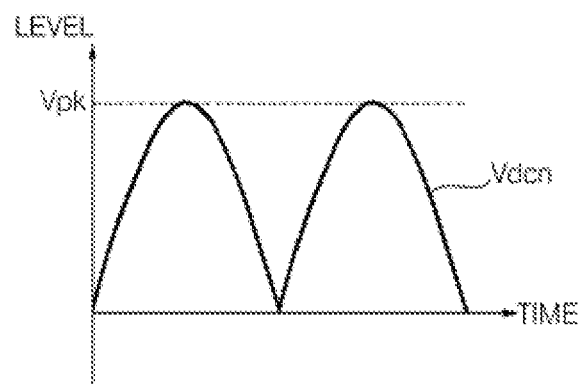
Figure 13C:
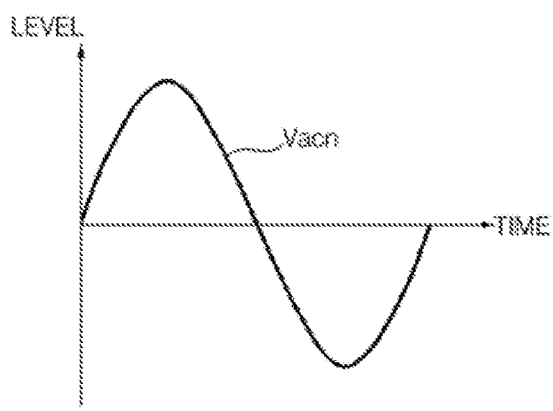

FIGS. 13A to 13C are diagrams referred to in the description of operation of FIG. 12.

Referring to FIGS. 13A to 13C, the solar cell module 100 in the power converting apparatus of FIG. 12 may output DC power Vpvn of a first level, as shown in FIG. 13A.

Next, the converter 530 in the power converting apparatus of FIG. 12 may output DC power Vdcn that pulses as shown in FIG. 13B. Meanwhile, the pulsing DC power Vdcn may correspond to a half sine wave voltage Vdcn. In this case, a pulse frequency may be two times greater than a grid frequency.

Next, the unfolding inverter 540 in the power converting apparatus of claim 12 may output DC power Vacn based on the half sine wave voltage Vdcn, as shown in FIG. 13C.

Figure 14:
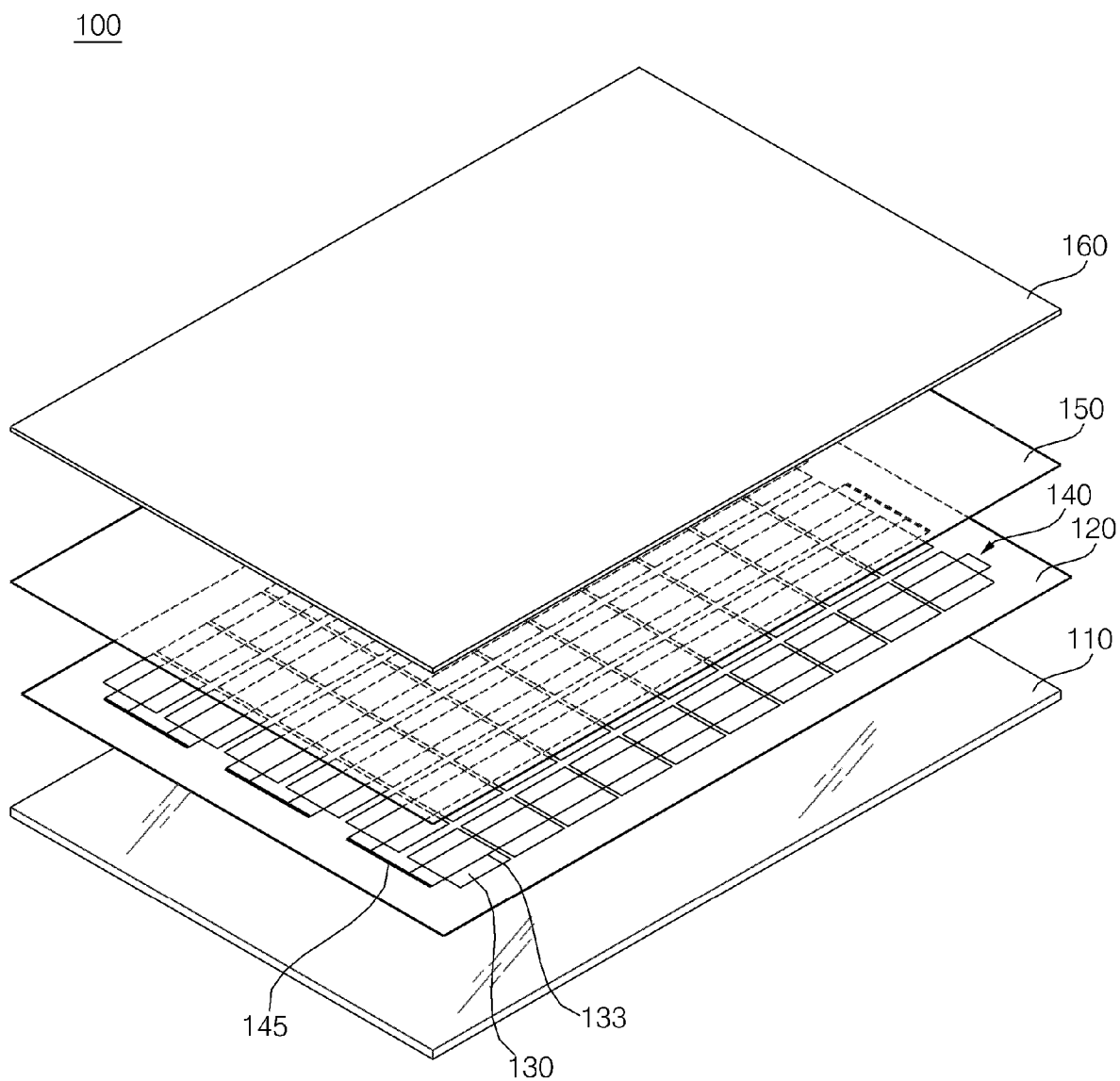
FIG. 14 is an exploded perspective view of the solar cell module of FIG. 2.

FIG. 14 is an exploded perspective view of the solar cell module of FIG. 2.

Referring to FIG. 14, the solar cell module 100 of FIG. 2 can include a plurality of solar cells 130. In addition, the solar cell module 100 can further include a first sealant 120 and a second sealant 150 provided on the upper surface and the lower surface of the solar cells 130, a rear substrate 110 provided under the first sealant 120, and a front substrate 160 provided on the second sealant 150.

The solar cell 130 is a semiconductor device which converts solar energy into electric energy and can be a silicon solar cell, a compound semiconductor solar cell, a tandem solar cell, a dye-sensitized solar cell, a CdTe solar cell, a CIGS solar cell or a thin film solar cell.

The solar cell 130 is formed on a light-receiving surface to which sunlight is input and a rear surface opposite the light-receiving surface. For example, the solar cell 130 can include a first conductivity type silicon substrate, a second conductivity type semiconductor layer which is formed on the silicon substrate and has a conductivity type opposite the first conductivity type, an antireflection film which includes at least one opening for partially exposing the second conductivity type semiconductor layer and is formed on the second conductivity type semiconductor layer, a front electrode contacting a portion of the second conductivity type semiconductor layer exposed through the at least one opening, and a rear electrode formed on the rear side of the silicon substrate.

The solar cells 130 can be electrically connected in series or parallel, or in serial-parallel. Specifically, the plurality of solar cells 130 can be electrically connected through the ribbon 133. The ribbon 133 can be attached to the front electrode formed on the light-receiving surface of a solar cell 130 and a rear electrode formed on the rear side of a neighboring solar cell 130.

The figure shows that the ribbon 133 is formed in two lines and the solar cells 130 are connected in a row through the ribbon 133 to form a solar cell string 140.

In this manner, six strings 140a, 140b, 140c, 140d, 140e and 140f are formed and each string can include ten solar cells, as described above with reference to FIG. 2.

The rear substrate 110 is a back sheet and serves to execute waterproofing, insulation and sunblocking functions. The rear substrate 110 can be a Tedlar/PET/Tedlar (TPT) type but the present invention is not limited thereto. In addition, although the rear substrate 110 is rectangular in FIG. 4, the rear substrate 110 can be manufactured in various forms such as a circle and a semicircle according to environment in which the solar cell module 100 is installed.

The first sealant 120 can be attached to the rear substrate 110 having the same size as the rear substrate 110, and a plurality of solar cells 130 can be arranged in several rows on the first sealant 120.

The second sealant 150 is positioned on the solar cells 130 and is attached to the first sealant 120 through lamination.

Here, the first sealant 120 and the second sealant 150 are used to chemically connect elements of the solar cells. Various materials such as ethylene vinyl acetate (EVA) film can be used as the first sealant 120 and the second sealant 150.

The front substrate 160 is positioned on the second sealant 150 such that sunlight is transmitted through the front substrate 160. It is desirable that the front substrate 160 be tempered glass in order to protect the solar cells 130 from external impact, but other materials can be used. It is more desirable that the front substrate 160 be low-iron tempered glass in order to prevent reflection of sunlight and to improve transmissivity of sunlight.

The photovoltaic module according to the present invention is not limited to the above-described embodiments and all or some of the embodiments can be selectively combined such that the embodiments can be modified in various manners.

Although the example embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power converting apparatus comprising:
a converter configured to convert a level of input DC power;
an inverter configured to convert a half sine wave voltage from the converter into an AC voltage;
an output current detector configured to detect an output current of the inverter;
an output voltage detector configured to detect an output voltage of the inverter; and
a controller configured to control the converter and the inverter based on the output current and the output voltage,
wherein a plurality of switching elements in the inverter is respectively turned on once in each cycle, and
wherein the controller is configured to, based on a difference between a grid voltage and the output current of the inverter, control a bidirectional current to flow to the converter.

2. The power converting apparatus of claim 1, wherein the controller is configured to:
control a current to flow from the inverter to the converter in a first period in which the current is output from the converter; and
control a current to flow from the converter to the inverter in a second period subsequent to the first period.

3. The power converting apparatus of claim 2, wherein the controller is configured to increase the first period as a phase difference between the grid voltage and the output current of the inverter increases.

4. The power converting apparatus of claim 1, further comprising a capacitor unit configured to store the input DC power at a front end of the converter,
wherein the controller is configured to:
control to store energy in the capacitor unit in a first period in which a current is output from the converter; and
output the energy from the capacitor in a second period subsequent to the first period.

5. The power converting apparatus of claim 1, wherein the controller is configured to increase an amount of negative polarity currents to be output from the converter as a phase difference between the grid voltage and the output current of the inverter increases.

6. The power converting apparatus of claim 1, wherein the controller is configured to increase a level of a current to flow from the inverter to the converter as a phase difference between the grid voltage and the output current of the inverter increases.

7. The power converting apparatus of claim 1, wherein the controller is configured to, when the output current of the inverter is lagging the grid voltage, output a negative polarity current in a first period in which a current is output from the converter, and to output a positive polarity current in a second period subsequent to the first period.

8. The power converting apparatus of claim 1, wherein the controller is configured to, when an output current of the inverter is leading the grid voltage, output a positive polarity current in a first period in which a current is output from the converter and to output a negative polarity current in a second period subsequent to the first period.

9. The power converting apparatus of claim 1, wherein the controller is configured to, when a phase of a current output from the inverter and a phase of the grid voltage coincide with each other, output only a positive polarity current, not a negative polarity current, from the converter.

10. The power converting apparatus of claim 1, further comprising a communication unit configured to receive phase information regarding the grid voltage.

11. The power converting apparatus of claim 1, wherein the converter further comprises:
a full bridge switching unit configured to switch the DC power; and
a transformer including an input side connected to an output terminal of the full bridge witching unit.

12. The power converting apparatus of claim 11, wherein the controller is configured to:
control a primary side voltage of the transformer to be greater than a secondary side voltage of the transformer in a partial section of a control cycle in a first period in which a current is output from the converter; and
control the primary side voltage of the transformer to be greater than the secondary side voltage of the transformer in a partial section of a control cycle in a second period of the current output from the converter.

13. The power converting apparatus of claim 11, wherein the controller is configured to:
control a primary side voltage of the transformer to be greater than a secondary side voltage of the transformer in a partial section of a control cycle after a first reference point in time in the first period; and
control the primary side voltage of the transformer to be greater than the secondary side voltage of the transformer in a partial section before the first reference point in time in a second period in which a current is output from the converter.

14. The power converting apparatus of claim 11,
wherein the inverter comprises:
a fifth switching element and a sixth switching element connected in series; and
a seventh switching element and an eighth switching element connected in series, and
wherein the AC power is output through a fifth node disposed between the fifth switching element and the sixth switching element and a sixth node disposed between the seventh switching element and the eighth switching element.

15. The power converting apparatus of claim 11,
wherein the full bridge switching unit comprises:
a first switching element and a second switching element connected in parallel; and
a third switching element and a fourth switching element respectively connected in series to the first and second switching elements, and
wherein the input side of the transformer is connected between a first node disposed between the first switching element and the second switching element and a second node disposed between the third switching element and the fourth switching element.

16. The power converting apparatus of claim 11,
wherein the converter further comprises:
a synchronization rectification unit connected to an output side of the transformer; and
a resonance capacitor and a resonance inductor, which are connected between the transformer and the synchronization rectification unit, and
wherein the controller is configured to vary a switching frequency of the full bridge switching unit based on an input voltage of the converter or a voltage of a dc terminal that is an output terminal of the converter.

17. The power converting apparatus of claim 16,
wherein the synchronization rectification unit comprises:
- a ninth switching element and a tenth switching element connected in series; and
- a first capacitor and a second capacitor connected in series, and wherein an output side of the transformer is connected between a third node disposed between the ninth switching element and the tenth switching element and a fourth node disposed between the first capacitor and the second capacitor.

18. A power converting apparatus comprising:
- a bidirectional converter configured to convert DC power input from a DC source into a half sine wave voltage;
- an unfolding inverter configured to allow a half sine wave voltage to pass therethrough by a plurality of switching elements during one half cycle of a grid voltage, and to reverse the half sine wave voltage during the other half cycle so that the half sine wave voltage is converted into AC power; and
- a power factor correction unit configured to control a power factor by controlling a phase of the grid voltage and a phase of the AC power output from the unfolding inverter.

19. The power converting apparatus of claim 18, wherein the unfolding inverter comprises:
- a first leg including a first switching element and a second switching element connected in series; and
- a second leg including a third switching element and a fourth switching element connected in series.

20. The power converting apparatus of claim 19, wherein the first leg and the second leg in the unfolding inverter have different switching frequencies.

21. The power converting apparatus of claim 18, wherein, in a section in which power output from the bidirectional converter is smaller than 0 or negative in polarity, current correction is performed to make the half sine wave voltage have an opposite polarity.

22. The power converting apparatus of claim 21, wherein a current corresponding to the half sine wave voltage includes a negative polarity current only in a section where current correction is performed, and includes a positive polarity current in other sections.

23. The power converting apparatus of claim 21, wherein a current from the bidirectional converter flows to an output terminal in a normal section and flows to an input terminal in a section where the current correction is performed.

24. A photovoltaic module comprising:
- a converter configured to convert a level of DC power;
- an inverter configured to convert a half sine wave voltage from the converter into an AC voltage;
- an output current detector configured to detect an output current from the inverter;
- an output voltage detector configured to detect an output voltage from the inverter; and
- a controller configured to control the converter and the inverter based on the output current and the output voltage, wherein a plurality of switching elements in the inverter is respectively turned on once in each cycle, and wherein the controller is configured to, based on a difference between a grid voltage and an output current of the inverter, control a bidirectional current to flow to the converter.

* * * * *